US011501517B2

(12) United States Patent
Takahashi et al.

(10) Patent No.: US 11,501,517 B2
(45) Date of Patent: Nov. 15, 2022

(54) INDIVIDUAL IDENTIFYING DEVICE

(71) Applicant: NEC Corporation, Tokyo (JP)

(72) Inventors: Toru Takahashi, Tokyo (JP); Rui Ishiyama, Tokyo (JP); Yuta Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 458 days.

(21) Appl. No.: 16/497,610

(22) PCT Filed: Mar. 28, 2017

(86) PCT No.: PCT/JP2017/012653
§ 371 (c)(1),
(2) Date: Sep. 25, 2019

(87) PCT Pub. No.: WO2018/179092
PCT Pub. Date: Oct. 4, 2018

(65) Prior Publication Data
US 2020/0019810 A1 Jan. 16, 2020

(51) Int. Cl.
G06V 10/46 (2022.01)
G03B 15/02 (2021.01)
(Continued)

(52) U.S. Cl.
CPC ........... G06V 10/462 (2022.01); G03B 15/02 (2013.01); G03B 17/565 (2013.01); G06K 9/6276 (2013.01); G06V 10/758 (2022.01)

(58) Field of Classification Search
CPC ............. G06K 9/00577; G06K 9/4671; G06K 9/6212; G06K 9/6267; G06K 9/6276;
(Continued)

(56) References Cited

U.S. PATENT DOCUMENTS

2011/0103652 A1 5/2011 Saruta et al.
2012/0002846 A1* 1/2012 Yokoi .................. G06K 9/6265
382/115
(Continued)

FOREIGN PATENT DOCUMENTS

JP 2011-096135 A 5/2011
JP 2013-064625 A 4/2013
WO 2014/021449 A1 2/2014

OTHER PUBLICATIONS

International Search Report of PCT/JP2017/012653 dated Jun. 27, 2017.

Primary Examiner — Margaret G Mastrodonato
(74) Attorney, Agent, or Firm — Sughrue Mion, PLLC

(57) ABSTRACT

An imaging unit, an extraction unit, a feature amount pair generation unit, and an imaging parameter adjustment unit are included. The imaging unit acquires images obtained by imaging each of N (N≥3) types of objects a plurality of times by setting a value of a specific imaging parameter, among a plurality of types of imaging parameters, as a certain candidate value and changing a value of the remaining imaging parameter. The extraction unit extracts a feature amount from each of the images. The feature amount pair generation unit generates, as a first feature amount pair for each of the N types of objects, a feature amount pair in which two feature amounts constituting the feature amount pair are extracted from images of objects of the same type, and generates, as a second feature amount pair for every combination of the N types of objects, a feature amount pair in which two feature amounts constituting the feature amount pair are extracted from a images of objects of the different types. The imaging parameter adjustment unit generates a first distribution that is a distribution of collation scores of the first feature amount pairs, generates a second distribution that is a distribution of collation scores of the second feature (Continued)

amount pairs, and on the basis of a degree of separation between the first distribution and the second distribution, determines the propriety of adopting the candidate value.

11 Claims, 36 Drawing Sheets

(51) Int. Cl.
  *G03B 17/56* (2021.01)
  *G06K 9/62* (2022.01)
  *G06V 10/75* (2022.01)

(58) Field of Classification Search
  CPC ......... G06K 2009/0059; G06K 9/2027; G03B 15/02; G03B 17/565
  See application file for complete search history.

(56) References Cited

U.S. PATENT DOCUMENTS

| | | | | |
|---|---|---|---|---|
| 2015/0323152 | A1* | 11/2015 | Mayer | F21V 17/04 |
| | | | | 362/235 |
| 2016/0042245 | A1* | 2/2016 | Ishiyama | G06K 9/6267 |
| | | | | 382/190 |
| 2017/0177976 | A1* | 6/2017 | Dube | G06K 9/52 |
| 2019/0026581 | A1* | 1/2019 | Leizerson | G01N 21/47 |

\* cited by examiner

FIG. 5

| A | SAMPLE ID | B=b1 | B=b2 | ... | B=bm |
|---|---|---|---|---|---|
| a1 | 001 | IMAGE G111 | IMAGE G112 | ... | IMAGE G11m |
| a1 | 002 | IMAGE G211 | IMAGE G212 | ... | IMAGE G21m |
| a1 | ... | ... | ... | ... | ... |
| a1 | N | IMAGE GN11 | IMAGE GN12 | ... | IMAGE GN1m |
| a2 | 001 | IMAGE G121 | IMAGE G122 | ... | IMAGE G12m |
| a2 | 002 | IMAGE G221 | IMAGE G222 | ... | IMAGE G22m |
| a2 | ... | ... | ... | ... | ... |
| a2 | N | IMAGE GN21 | IMAGE GN22 | ... | IMAGE GN2m |
| ... | ... | ... | ... | ... | ... |
| an | 001 | IMAGE G1n1 | IMAGE G1n2 | ... | IMAGE G1nm |
| an | 002 | IMAGE G2n1 | IMAGE G2n2 | ... | IMAGE G2nm |
| an | ... | ... | ... | ... | ... |
| an | N | IMAGE GNn1 | IMAGE GNn2 | ... | IMAGE GNnm |

FIG. 6

| A | SAMPLE ID | B=b1 | B=b2 | ... | B=bm |
|---|---|---|---|---|---|
| a1 | 001 | FEATURE AMOUNT V111 | FEATURE AMOUNT V112 | ... | FEATURE AMOUNT V11m |
|  | 002 | FEATURE AMOUNT V211 | FEATURE AMOUNT V212 | ... | FEATURE AMOUNT V21m |
|  | ... | ... | ... | ... | ... |
|  | N | FEATURE AMOUNT VN11 | FEATURE AMOUNT VN12 | ... | FEATURE AMOUNT VN1m |
| a2 | 001 | FEATURE AMOUNT V121 | FEATURE AMOUNT V122 | ... | FEATURE AMOUNT V12m |
|  | 002 | FEATURE AMOUNT V221 | FEATURE AMOUNT V222 | ... | FEATURE AMOUNT V22m |
|  | ... | ... | ... | ... | ... |
|  | N | FEATURE AMOUNT VN21 | FEATURE AMOUNT VN22 | ... | FEATURE AMOUNT VN2m |
| ... | ... | ... | ... | ... | ... |
| an | 001 | FEATURE AMOUNT V1n1 | FEATURE AMOUNT V1n2 | ... | FEATURE AMOUNT V1nm |
|  | 002 | FEATURE AMOUNT V2n1 | FEATURE AMOUNT V2n2 | ... | FEATURE AMOUNT V2nm |
|  | ... | ... | ... | ... | ... |
|  | N | FEATURE AMOUNT VNn1 | FEATURE AMOUNT VNn2 | ... | FEATURE AMOUNT VNnm |

FIG. 7

| A | FIRST FEATURE AMOUNT PAIR |
|---|---|
| a1 | COMBINATION OF TWO SELECTED FROM m PIECES OF FEATURE AMOUNTS (V111, V112, ..., V11m) |
| | COMBINATION OF TWO SELECTED FROM m PIECES OF FEATURE AMOUNTS (V211, V212, ..., V21m) |
| | ⋮ |
| | COMBINATION OF TWO SELECTED FROM m PIECES OF FEATURE AMOUNTS (VN11, VN12, ..., VN1m) |
| a2 | COMBINATION OF TWO SELECTED FROM m PIECES OF FEATURE AMOUNTS (V121, V122, ..., V12m) |
| | COMBINATION OF TWO SELECTED FROM m PIECES OF FEATURE AMOUNTS (V221, V222, ..., V22m) |
| | ⋮ |
| | COMBINATION OF TWO SELECTED FROM m PIECES OF FEATURE AMOUNTS (VN21, VN22, ..., VN2m) |
| ⋯ | ⋯ |
| an | COMBINATION OF TWO SELECTED FROM m PIECES OF FEATURE AMOUNTS (V1n1, V1n2, ..., V1nm) |
| | COMBINATION OF TWO SELECTED FROM m PIECES OF FEATURE AMOUNTS (V2n1, V2n2, ..., V2nm) |
| | ⋮ |
| | COMBINATION OF TWO SELECTED FROM m PIECES OF FEATURE AMOUNTS (VNn1, VNn2, ..., VNnm) |

FIG. 8

| A | SECOND FEATURE AMOUNT PAIR |
|---|---|
| a1 | COMBINATION OF FEATURE AMOUNT V11x (x=1, 2, ···, m) AND FEATURE AMOUNT Viyy (i≠1, y IS ARBITRARY) |
| | COMBINATION OF FEATURE AMOUNT V21x (x=1, 2, ···, m) AND FEATURE AMOUNT Viyy (i≠2, y IS ARBITRARY) |
| | ⋮ |
| | COMBINATION OF FEATURE AMOUNT VN1x (x=1, 2, ···, m) AND FEATURE AMOUNT Viyy (i≠N, y IS ARBITRARY) |
| a2 | COMBINATION OF FEATURE AMOUNT V12x (x=1, 2, ···, m) AND FEATURE AMOUNT Viyy (i≠1, y IS ARBITRARY) |
| | COMBINATION OF FEATURE AMOUNT V22x (x=1, 2, ···, m) AND FEATURE AMOUNT Viyy (i≠2, y IS ARBITRARY) |
| | ⋮ |
| | COMBINATION OF FEATURE AMOUNT VN2x (x=1, 2, ···, m) AND FEATURE AMOUNT Viyy (i≠N, y IS ARBITRARY) |
| ⋯ | ⋯ |
| an | COMBINATION OF FEATURE AMOUNT V1nx (x=1, 2, ···, m) AND FEATURE AMOUNT Viyy (i≠1, y IS ARBITRARY) |
| | COMBINATION OF FEATURE AMOUNT V2nx (x=1, 2, ···, m) AND FEATURE AMOUNT Viyy (i≠2, y IS ARBITRARY) |
| | ⋮ |
| | COMBINATION OF FEATURE AMOUNT VNnx (x=1, 2, ···, m) AND FEATURE AMOUNT Viyy (i≠N, y IS ARBITRARY) |

FIG. 9

| A | SCORE DISTRIBUTION OF FIRST FEATURE AMOUNT PAIR (FIRST DISTRIBUTION) | SCORE DISTRIBUTION OF SECOND FEATURE AMOUNT PAIR (SECOND DISTRIBUTION) | DEGREE OF SEPARATION |
|---|---|---|---|
| a1 | DISTRIBUTION D11 | DISTRIBUTION D12 | SP1 |
| a2 | DISTRIBUTION D21 | DISTRIBUTION D22 | SP2 |
| ⋮ | ⋮ | ⋮ | ⋮ |
| an | DISTRIBUTION Dn1 | DISTRIBUTION Dn2 | SPn |

FIG. 16

| FEATURE AMOUNT | SUPPLEMENTARY INFORMATION |
|---|---|
| FEATURE AMOUNT PF1 | SUPPLEMENTARY INFORMATION SI1 |
| FEATURE AMOUNT PF2 | SUPPLEMENTARY INFORMATION SI2 |
| ⋮ | ⋮ |
| FEATURE AMOUNT PFn | SUPPLEMENTARY INFORMATION SIn |

INDIVIDUAL IDENTIFYING DEVICE

CROSS REFERENCE TO RELATED APPLICATIONS

This application is a National Stage of International Application No. PCT/JP2017/012653 filed Mar. 28, 2017.

TECHNICAL FIELD

The present invention relates to an individual identifying device, an individual identifying method, an individual registration device, an individual registration method, an individual collation device, an individual collation method, and a program.

BACKGROUND ART

Attempts are made to utilize individual difference in fine uneven patterns formed on surfaces of objects for authentication and verification.

For example, Patent Document 1 describes use of an uneven pattern provided by a satin pattern formed on a surface of an object, for authentication and verification of the object. Patent Document 1 describes an imaging aid, an imaging device, and an imaging method for capturing such fine uneven patterns with good contrast.

Specifically, an imaging aid described in Patent Document 1 aids photographing of a predetermined area of a surface of an object having fine irregularities and strong specular reflection. The imaging aid includes a light source unit that emits light, and a covering portion. The covering portion has a shape that covers a predetermined area of a surface of an object. In the covering portion, a partial surface corresponding to the inside of the range of a predetermined angle $\theta$ from the normal direction directly facing the predetermined area is black, and the remaining surface corresponding to the range of an angle $\varphi$ is a light source area surface that diffuses and emits light emitted from the light source unit. The covering portion also has a mechanism for performing image capturing of a predetermined area from the normal direction, in the black area. Further, the covering portion is configured such that the height of the side surface is adjustable by a screw mechanism. When the height of the side surface of the covering portion is changed, the range of the angle $\varphi$ and the range of the angle $\theta$ vary. When the range of the angle $\varphi$ and the range of the angle $\theta$ are changed, the light and dark contrast in the uneven portion is changed. In Patent Document 1, it is configured to obtain a captured image in which the light and dark contrast of the uneven portion is emphasized, by adjusting the range of the angle $\theta$ and the range of the angle $\varphi$.

On the other hand, Patent Document 2 describes an image processing device that identifies objects that are similar but different. The image processing device includes an imaging means, a management means, first to third specifying means, and an output means. The imaging means acquires a plurality of images captured on the basis of a plurality of types of imaging conditions respectively. The management means extracts a feature amount from each of the captured images, and manages a set of the extracted feature amounts as a feature amount cluster, in association with the imaging condition of the captured image from which the feature amount is extracted. The first specifying means specifies, from a feature amount cluster group managed by the management means, a second feature amount cluster including a feature amount similar to the feature amount in a first feature amount cluster managed by the management means. The second specifying means specifies the feature amounts associated with the same imaging condition from the first feature amount cluster and the second feature amount cluster, and obtains a distance between the specified feature amounts. The third specifying means specifies a largest distance from the distances obtained for a plurality of types of imaging conditions by the second specifying means. The output means outputs, among a plurality of types of the imaging conditions, the imaging condition from which the largest distance specified by the third specifying means is obtained, as an imaging condition by which the first feature amount cluster and the second feature amount cluster can be discriminated from each other.

Then, in Patent Document 2, an object is identified using the feature amount cluster learned and the imaging condition set by the processing described above. Specifically, first, a feature amount is extracted from an image in which an object is shown, and a feature amount having a smallest distance from the extracted feature amount is selected as a primary identifying feature amount from the feature amount cluster. Then, when no imaging condition is applied to the primary identifying feature, the identifying process ends. On the other hand, when an imaging condition is applied to the primary identifying feature amount, the imaging condition is changed to the applied one, the object is imaged again, and a feature amount is extracted from the image. Then, secondary identification is performed on the basis of the extracted feature amount and the distance between the primary identifying feature amount and a feature amount close to the primary identifying feature amount.

Patent Document 1: WO 2014/021449 A
Patent Document 2: JP 2011-096135 A

SUMMARY

To utilize a fine uneven pattern formed on a surface of an object for authentication and collation of the object, it is necessary to capture an image from which a fine uneven pattern unique to the object can be read stably. In Patent Document 1, although an imaging aid for capturing a fine uneven pattern on a surface of an object with good contrast is proposed, no attention is paid to stable reading of a fine uneven pattern unique to the object among fine uneven patterns on the surface of the object. For example, on the head surfaces of bolts or the like that are mass-produced using a certain manufacturing mold, there is a fine uneven pattern unique to each of the products, in addition to the fine uneven patterns unique to the manufacturing mold. When performing authentication and collation of objects, it is more important that reading of a fine uneven pattern unique to each of the products can be performed stably, than reading of fine uneven patterns unique to the manufacturing mold.

On the other hand, in Patent Document 2, imaging conditions useful for discriminating similar objects are determined on the basis of the distance between the features extracted from the images obtained by imaging the objects. Therefore, by using the technique described in Patent Document 2, it is possible to determine an imaging condition by which a pattern useful for discriminating two similar objects, among the patterns on the surfaces of the objects, can be read. However, the imaging condition determined in Patent Document 2 is an imaging condition useful for identifying two objects that are similar to each other. Therefore, with the determined imaging condition, it is difficult to identify each of three or more objects that are similar to one another.

The present invention is to provide an individual identifying device that solves the problem described above, that is, a problem that it is difficult to determine an imaging condition useful for identifying three or more types of objects that are similar to one another.

An individual identifying device according to an exemplary aspect of the present invention includes
- an imaging unit that acquires a plurality of images obtained by imaging each of N (N≥3) types of objects a plurality of times by setting a value of a specific imaging parameter, among a plurality of types of imaging parameters, as a certain candidate value and changing a value of a remaining imaging parameter;
- an extraction unit that extracts a feature amount from each of the plurality of the images;
- a feature amount pair generation unit that generates, as a first feature amount pair for each of the N types of objects, a feature amount pair in which two feature amounts constituting the feature amount pair are extracted from a plurality of images of objects of the same type, and generates, as a second feature amount pair for every combination of the N types of objects, a feature amount pair in which two feature amounts constituting the feature amount pair are extracted from a plurality of images of objects of different types; and
- an imaging parameter adjustment unit that generates a first distribution that is a distribution of collation scores of the first feature amount pairs, generates a second distribution that is a distribution of collation scores of the second feature amount pairs, and on the basis of a degree of separation between the first distribution and the second distribution, determines the propriety of adopting the candidate value.

An individual identifying method according to another exemplary aspect of the present invention includes
- acquiring a plurality of images obtained by imaging each of N (N≥3) types of objects a plurality of times by setting a value of a specific imaging parameter, among a plurality of types of imaging parameters, as a certain candidate value and changing a value of the remaining imaging parameter;
- extracting a feature amount from each of the plurality of the images;
- generating, as a first feature amount pair for each of the N types of objects, a feature amount pair in which two feature amounts constituting the feature amount pair are extracted from a plurality of images of objects of the same type, and generating, as a second feature amount pair for every combination of the N types of objects, a feature amount pair in which two feature amounts constituting the feature amount pair are extracted from a plurality of images of objects of different types; and
- generating a first distribution that is a distribution of collation scores of the first feature amount pairs, generating a second distribution that is a distribution of collation scores of the second feature amount pairs, and on the basis of a degree of separation between the first distribution and the second distribution, determining the propriety of adopting the candidate value, and on the basis of a degree of separation between the first distribution and the second distribution, determining the propriety of adopting the candidate value.

An individual registration device according to another exemplary aspect of the present invention includes
- an imaging parameter storage unit that stores a value of an imaging parameter useful for identifying three or more types of objects that are similar to one another;
- an imaging condition control unit that sets an imaging condition determined by the value of the imaging parameter;
- an imaging unit that acquires an image of an object under the imaging condition; and
- an extraction unit that extracts a feature amount from the image, and registers the feature amount in the storage unit.

An individual registration method according to another exemplary aspect of the present invention includes
- setting an imaging condition determined by a value of an imaging parameter useful for identifying three or more types of objects that are similar to one another;
- acquiring an image of an object under the imaging condition; and
- extracting a feature amount from the image, and registering the feature amount in a storage unit.

An individual collation device according to another exemplary aspect of the present invention includes
- an imaging parameter storage unit that stores a value of an imaging parameter useful for identifying three or more types of objects that are similar to one another;
- an imaging condition control unit that sets an imaging condition determined by the value of the imaging parameter;
- an imaging unit that acquires an image of an object under the imaging condition;
- an extraction unit that extracts a feature amount from the image; and
- a collation unit that collates the feature amount with a registered feature amount stored in a storage unit.

An individual collation method according to another exemplary aspect of the present invention includes
- setting an imaging condition determined by a value of an imaging parameter useful for identifying three or more types of objects that are similar to one another;
- acquiring an image of an object under the imaging condition;
- extracting a feature amount from the image; and
- collating the feature amount with a registered feature amount stored in a storage unit.

A program according to another exemplary aspect of the present invention causes a computer to function as
- an imaging unit that acquires a plurality of images obtained by imaging each of N (N≥3) types of objects a plurality of times by setting a value of a specific imaging parameter, among a plurality of types of imaging parameters, as a certain candidate value and changing a value of the remaining imaging parameter;
- an extraction unit that extracts a feature amount from each of the plurality of the images;
- a feature amount pair generation unit that generates, as a first feature amount pair for each of the N types of objects, a feature amount pair in which two feature amounts constituting the feature amount pair are extracted from a plurality of images of objects of the same type, and generates, as a second feature amount pair for every combination of the N types of objects, a feature amount pair in which two feature amounts constituting the feature amount pair are extracted from a plurality of images of objects of different types; and
- an imaging parameter adjustment unit that generates a first distribution that is a distribution of collation scores of the first feature amount pairs, generates a second distribution that is a distribution of collation scores of the second feature amount pairs, and on the basis of a degree of separation between the first distribution and the second distribution, determines the propriety of adopting the candidate value.

Since the present invention is configured as described above, the present invention can determine an imaging condition useful for identifying three or more types of objects that are similar to one another.

BRIEF DESCRIPTION OF DRAWINGS

FIG. 5 is a diagram illustrating exemplary contents of an image storage unit of the individual identifying device according to the first exemplary embodiment of the present invention.

FIG. 6 is a diagram illustrating exemplary contents of a feature amount storage unit of the individual identifying device according to the first exemplary embodiment of the present invention.

FIG. 7 is a diagram illustrating exemplary contents of a first feature amount pair storage unit of the individual identifying device according to the first exemplary embodiment of the present invention.

FIG. 8 is a diagram illustrating exemplary contents of a second feature amount pair storage unit of the individual identifying device according to the first exemplary embodiment of the present invention.

FIG. 9 is a diagram illustrating exemplary contents of a distribution storage unit of the individual identifying device according to the first exemplary embodiment of the present invention.

FIG. 16 is a diagram illustrating exemplary contents of individual registration information stored in a feature amount storage unit of the individual identifying device according to the first exemplary embodiment of the present invention.

EXEMPLARY EMBODIMENTS

First Exemplary Embodiment

Figure 1:
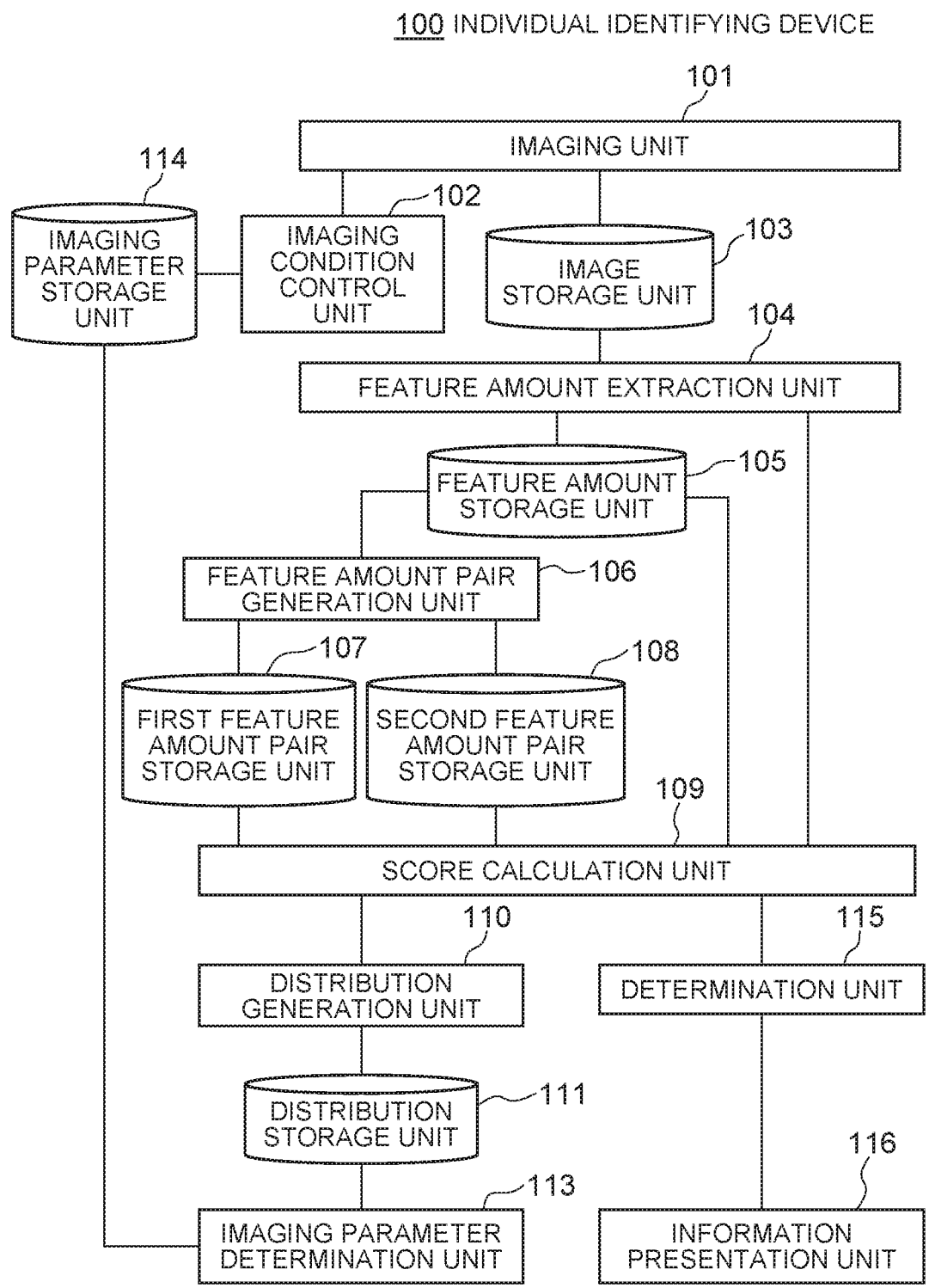
FIG. 1 is a block diagram of an individual identifying device according to a first exemplary embodiment of the present invention.

FIG. 1 is a block diagram of an individual identifying device according to the present embodiment. An individual identifying device 100 according to the present embodiment includes an imaging unit 101, an imaging condition control unit 102, an image storage unit 103, a feature amount extraction unit 104, a feature amount storage unit 105, a feature amount pair generation unit 106, a first feature amount pair storage unit 107, a second feature amount pair storage unit 108, a score calculation unit 109, a distribution generation unit 110, a distribution storage unit 111, an imaging parameter determination unit 113, an imaging parameter storage unit 114, a determination unit 115, and an information presentation unit 116.

The imaging unit 101 has a function of capturing, by a camera, images of uneven patterns on a surface of an object to be managed, on the basis of the imaging conditions having been set. Uneven patterns on a surface of an object may be a satin pattern formed on a surface of a product that is an object, fine irregularities, patterns, or the like that are spontaneously generated in the manufacturing process.

The imaging condition control unit 102 has a function of controlling an imaging condition of the imaging unit 101. The imaging condition control unit 102 sets an imaging condition according to a combination of values of a plurality of types of imaging parameters. The imaging parameters include a plurality of types such as a distance between an object and a camera, conditions for illumination emitted to the object (emitting direction of illumination light to the object, wavelength, intensity, and the like), an angle of view of the camera, relative posture between the object and the camera, and resolution of the camera. The imaging condition control unit 102 changes the imaging condition of the imaging unit 101 by changing the combination of values of the imaging parameters.

The image storage unit 103 has a function of storing an image of an uneven pattern on the surface of the object obtained by imaging by the imaging unit 101.

The feature amount extraction unit 104 has a function of extracting a feature amount from an image of an uneven pattern on a surface of the object stored in the image storage unit 103. For example, the feature amount extraction unit 104 extracts characteristic points (feature points) existing at edges or corners from an image, by the action of a differential filter (sobel or the like) on the two-dimensional luminance distribution of the image of the uneven pattern. Then, the feature amount extraction unit 104 calculates, from an extracted feature point and a pixel value of a pixel in the vicinity thereof, the feature amount relating to the feature point (local feature amount). As the local feature amount, a method of assigning an orientation (direction) for each feature point on the basis of the gradient or the gradient direction of the distribution of pixel values in a two-dimensional array, such as Scale Invariant Feature Transform (SIFT) or Binary Robust Independent Elementary Features (BRIEF) can be used, for example. However, it is not limited thereto. The image itself of the uneven pattern may be used as a feature amount.

The feature amount storage unit 105 has a function of storing the feature amount extracted by the feature amount extraction unit 104.

The feature amount pair generation unit 106 has a function of generating a first feature amount pair for each object from a plurality of feature amounts of a plurality of objects stored in the feature amount storage unit 105. Here, the first feature amount pair means a pair in which two features constituting the pair are extracted from a plurality of images of objects of the same type (imaging conditions of the images are different). The feature amount pair generation unit 106 also has a function of generating a second feature amount pair for every combination of the objects from a plurality of feature amounts of the objects stored in the feature amount storage unit 105. Here, the second feature amount pair means a pair in which two feature amounts constituting the pair are extracted from a plurality of images of objects of different types (imaging conditions of the images may be the same or different).

The first feature amount pair storage unit 107 has a function of storing a plurality of first feature amount pairs generated by the feature amount pair generation unit 106. The second feature amount pair storage unit 108 has a function of storing a plurality of second feature amount pairs generated by the feature amount pair generation unit 106.

The score calculation unit 109 has a function of calculating a correlation between two feature amounts, and calculating a collation score representing the degree of similarity between the two feature amounts. Here, feature amount pairs of two feature amounts for which a score is calculated include the first feature amount pair, the second feature amount pair, and a pair configured of a feature amount that is a target of identification/collation extracted by the feature amount extraction unit 104 and a reference feature amount stored in the feature amount storage unit 105. For example, the score calculation unit 109 calculates a score by using the number of local feature amounts corresponding to both feature amounts. Alternatively, the score calculation unit 109 calculates a score from the Hamming distance between codes representing the local feature amounts of the two, for example. The score may be a value that increases as the two feature amounts are similar, that is, the distance between the two feature amounts is smaller, or may be a value that decreases in contrast. However, the method of calculating the score is not limited to the example described above.

The distribution generation unit 110 has a function of generating a first distribution that is a distribution of collation scores of a plurality of first feature amount pairs. The distribution generation unit 110 also has a function of generating a second distribution that is a distribution of collation scores of a plurality of second feature amount pairs. Here, each of the first distribution and the second distribution is information in which a range of scores are divided into some sections and the number of the first feature amount pairs and the number of the second feature pairs appearing in each section are expressed in the form of a table form or a graph.

The distribution storage unit 111 has a function of storing the first distribution and the second distribution generated by the distribution generation unit 110.

The imaging parameter determination unit 113 has a function of calculating the degree of separation between the first distribution and the second distribution stored in the distribution storage unit 111. The imaging parameter determination unit 113 also has a function of determining a value of an imaging parameter to be used, on the basis of the calculated degree of separation.

The imaging parameter storage unit 114 has a function of storing the value of the imaging parameter determined by the imaging parameter determination unit 113.

The determination unit 115 has a function of generating a determination result of identification and collation, on the basis of the score calculated by the score calculation unit 109 for a pair configured of a feature amount that is a target of identification and collation extracted by the feature amount extraction unit 104 and a reference feature amount stored in the feature amount storage unit 105.

The information presentation unit 116 has a function of presenting object management information on the basis of a determination result of the determination unit 115.

Figure 2:
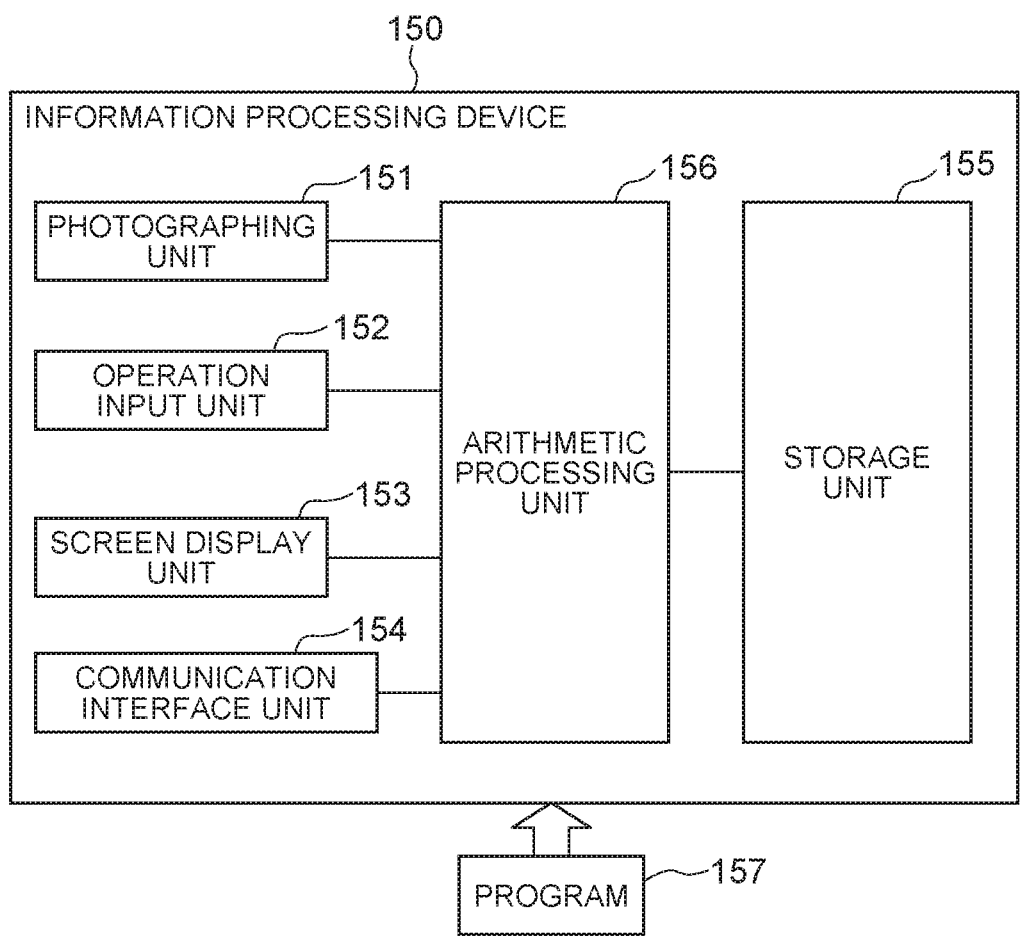
FIG. 2 is a block diagram illustrating exemplary hardware of the individual identifying device according to the first exemplary embodiment of the present invention.

The individual identifying device 100 can be implemented by an information processing device 150 such as a personal computer or a smart phone including an photographing unit 151 such as a camera, an operation input unit 152 such as a keyboard and a mouse, a screen display unit 153 such as a liquid crystal display, a communication interface unit 154, a storage unit 155 such as a memory and a hard disk, and at least one arithmetic processing unit 156 such as a microprocessor, and a program 157, as illustrated in FIG. 2, for example.

The program 157 is read from an external computer-readable storage medium into the memory when the information processing device 150 is started, and controls operation of the arithmetic processing unit 156 to implement, on the arithmetic processing unit 156, functional means such as the imaging unit 101, the imaging condition control unit 102, the image storage unit 103, the feature amount extraction unit 104, the feature amount storage unit 105, the feature amount pair generation unit 106, the first feature amount pair storage unit 107, the second feature amount pair storage unit 108, the score calculation unit 109, the distribution generation unit 110, the distribution storage unit 111, the imaging parameter determination unit 113, the imaging parameter storage unit 114, the determination unit 115, and the information presentation unit 116.

Next, operation of the individual identifying device 100 according to the present embodiment will be described with reference to the drawings. Operation of the individual identifying device 100 is roughly divided into three as described below.

(a) Operation of pre-processing to determine a value of a specific imaging parameter
(b) Operation of individual registration
(c) Operation of individual identification and individual collation

[Pre-Processing: Process of Determining Value of Specific Imaging Parameter]

First, as a preliminary step, operation of a process of determining a value of a specific imaging parameter will be described.

Figure 3:
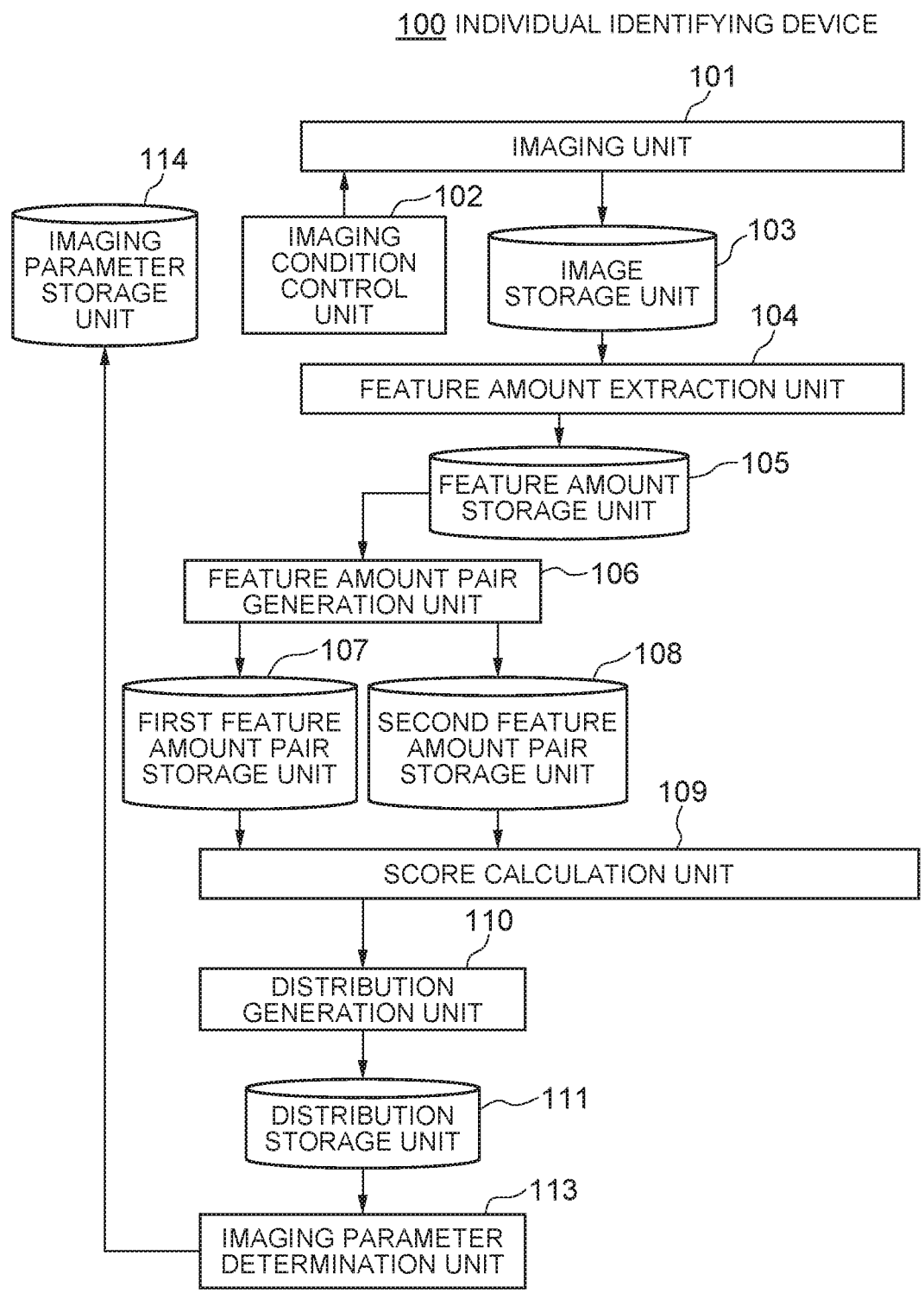
FIG. 3 is an operational flow of an exemplary process of determining a value of a specific imaging parameter in the individual identifying device according to the first embodiment of the present invention.
Figure 4:
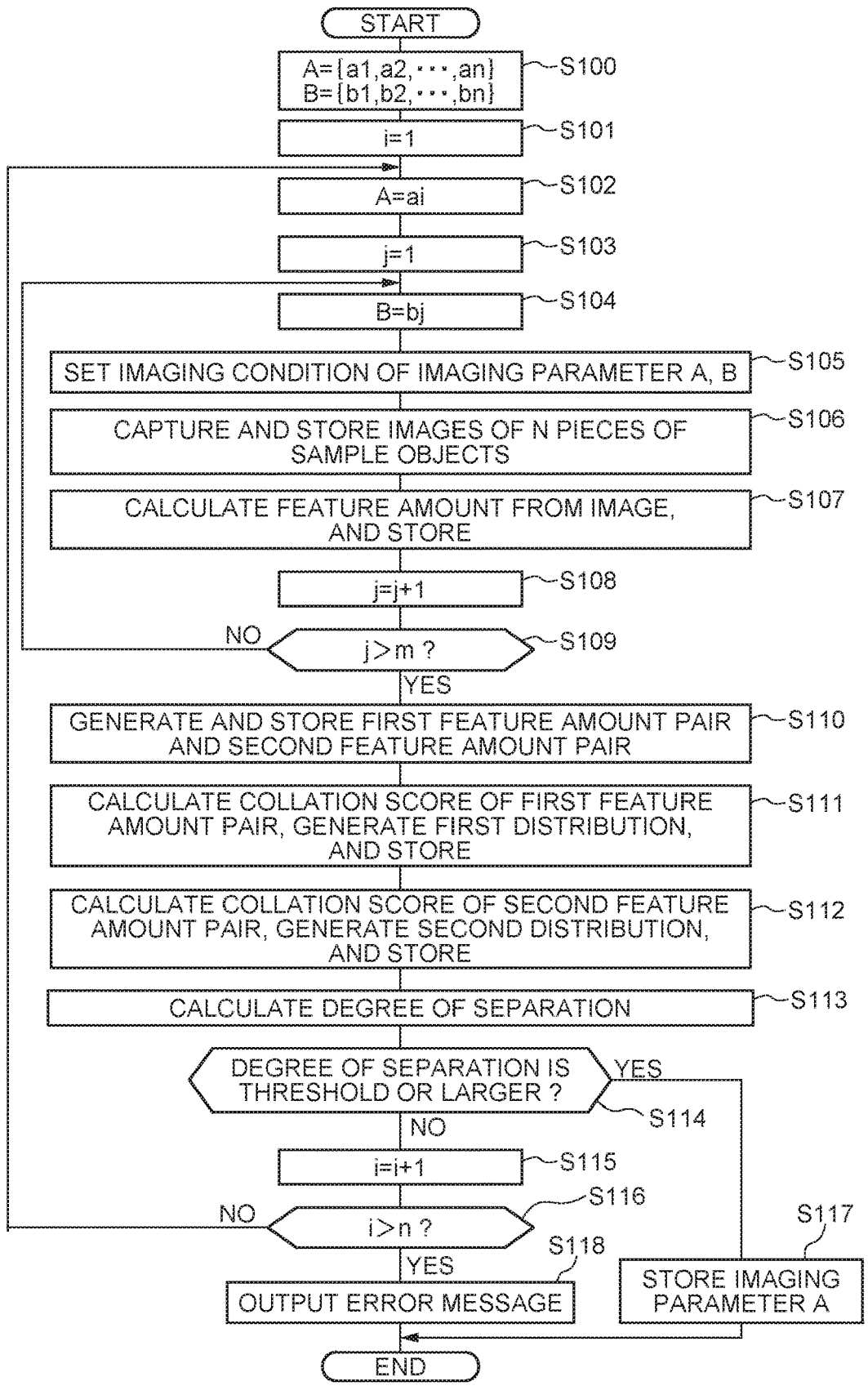
FIG. 4 is a flowchart illustrating an exemplary process of determining a value of a specific imaging parameter in the individual identifying device according to the first exemplary embodiment of the present invention.

FIGS. 3 and 4 illustrate an operational flow and a flowchart of an exemplary process of determining a value of a specific imaging parameter.

First, assuming that specific one or more imaging parameters, among a plurality of types of imaging parameters, are imaging parameters A, and that the imaging parameters other than the imaging parameter A are imaging parameters B, the imaging condition control unit 102 generates candidate values a1, a2, . . . , an for the values of the imaging parameters A and candidate values b1, b2, . . . bm for the values of the imaging parameters B (step S101). For example, in the case of imaging an uneven pattern on a surface of an object by using an imaging aid described in Patent Document 1, the height of a side surface of the covering portion is used as the imaging parameter A, and as candidate values thereof, some values of heights a1, a2, . . . , an are generated. Further, for example, the object posture at the time of imaging is used as the imaging parameter B, and as candidate values thereof, some values of postures b1, b2, . . . , bm are generated. In the above example, the imaging parameter A is configured of one type of parameter. However, it may be configured of a plurality of types of parameters. For example, in the case of imaging an uneven pattern on the surface of an object using the imaging aid described in Patent Document 1, two parameters, namely the height of a side surface of the covering portion and the intensity of illumination, are used as the imaging parameters A, and some combinations of the height and the intensity of illumination are generated as candidate values a1, a2, . . . , an. Similarly, the imaging parameters B may be configured of a plurality of types of parameters.

Then, the imaging condition control unit 102 sets a variable i, for selecting a candidate value of the imaging parameter A, to 1 (step S101), and selects a candidate value a1 as the imaging parameter A (step S102). Then, the imaging condition control unit 102 sets 1 to the variable i for selecting a candidate value of the imaging parameter B (step S103), and selects a candidate value b1 as the imaging parameter B (step S104). Then, the imaging condition control unit 102 sets an imaging condition determined by the candidate value a1 and the candidate value b1 selected, to the imaging unit 101 (step S105). Setting of the imaging condition to the imaging unit 101 may be automated, or may be set manually by the user by displaying the imaging condition on the screen display unit 153. Next, the imaging unit 101 captures an image of each of previously prepared N (N≥3) pieces of sample objects at least once, and stores it in the image storage unit 103 (step S106). Through the above-described operation, in the image storage unit 103, N pieces of images G111, G211, . . . , and GN11, illustrated in FIG. 5, for example, are stored in association with the IDs and the imaging conditions (a1, b1) of the sample objects.

Then, the feature amount extraction unit 104 reads, from the image storage unit 103, the images of the N pieces of sample objects captured by being imaged under the imaging conditions of the candidate values a1 and b1, extracts a feature amount from each image, and stores it in the feature amount storage unit 105 (step S107). Thereby, in the feature amount storage unit 105, N pieces of feature amounts V111, V211, . . . , VN11, illustrated in FIG. 6, for example, are stored in association with the IDs and the imaging conditions (a1, b1) of the sample objects.

Then, the imaging condition control unit 102 increments the variable j (step S108), and when the variable j becomes larger than m, the imaging condition control unit 102 returns to step S104 and repeats a process similar to that described above. Thereby, the images of the N pieces of sample objects that are the same as above are captured under the imaging conditions of the candidate values a1 and b2, and a feature amount is extracted from each of the images. A similar operation is repeated until the variable j becomes larger than m. Thereby, each of the N pieces of sample objects are imaged a plurality of times by fixing the value of the imaging parameter A to a1 and sequentially changing the value of the imaging parameter B from b1, b2, . . . bm, and also, a feature amount is extracted from each of the images. The images G111, G211, . . . , GN11, G112, G212, . . . , GN12, . . . , G11m, G21m, . . . , GN1m, illustrated in FIG. 5, and the feature amounts V111, V211, . . . , VN11, V112, V212, . . . , VN12, . . . , V11m, V21m, . . . , VN1m, illustrated in FIG. 6, are images and feature amounts obtained by imaging performed as described above Next, the feature amount pair generation unit 106 reads, from the feature amount storage unit 105, the feature amounts V111, V211, . . . , VN11, V112, V212, . . . , VN12, . . . , V11m, and V21m, generates the first feature amount pair and the second feature amount pair, and stores them in the first feature amount pair storage unit 107 and the second feature amount pair storage unit 108 (step S110). Thereby, in the first feature amount pair storage unit 107, the first feature amount pairs configured of a combination of two selected from m pieces of the feature amounts (V111, V112, . . . , V11m), a combination of two selected from m pieces of the feature amounts (V211, V212, . . . , V21m), and a combination of two selected from m pieces of feature amounts (VN11, VN12, . . . , VN1m), as illustrated in FIG. 7, for example, are stored in association with the imaging parameter A=a1. Also, in the second feature amount pair storage unit 108, the second feature amount pairs configured of a combination of the feature amount V11x (x=1, 2, . . . , m) and a feature amount Viyy (i≠1, y is arbitrary), a combination of a feature amount V21x (x=1, 2, . . . , m) and the feature amount Viyy (i≠1, y is arbitrary), . . . , and a combination of a feature amount VN1x (x=1, 2, . . . , m) and the feature amount Viyy (i≠1, y is arbitrary), illustrated in FIG. 8, for example, are stored in association with the imaging parameter A=1a.

Then, the score calculation unit 109 reads a first feature amount pair associated with the imaging parameter A=a1 from the first feature amount pair storage unit 107, calculates a correlation between the feature amounts constituting the pair to thereby calculate a collation score. The distribution generation unit 110 generates a first distribution from the calculated collation score of the first feature amount pair and stores it in the distribution storage unit 111 (step S111). Thereby, in the distribution storage unit 111, a distribution D11 of the first feature amount pairs is stored in association with the imaging parameters A=a1 as illustrated in FIG. 9, for example.

Further, the score calculation unit 109 reads a second feature amount pair associated with the imaging parameter A=a1 from the second feature amount pair storage unit 108, calculates a correlation between the feature amounts constituting the pair to thereby calculate a collation score. The distribution generation unit 110 generates a second distribution from the calculated collation score of the second feature amount pair and stores it in the distribution storage unit 111 (step S112). Thereby, in the distribution storage unit 111, a distribution D12 of the second feature amount pairs is stored in association with the imaging parameters A=a1 as illustrated in FIG. 9, for example.

Then, the imaging parameter determination unit 113 reads the first distribution D11 and the second distribution D12 from the distribution storage unit 111, calculates the degree of separation thereof, and stores it in the distribution storage unit 111. Thereby, in the distribution storage unit 111, a degree of separation SP1 is stored in association with the imaging parameters A=a1 as illustrated in FIG. 9, for example.

Here, the degree of separation SP1 of the two distributions is a measure or an index value indicating how much the two distributions D11 and D12 are separated. As the degree of separation, measures provided below as examples may be used, for example.

Example 1 of Measure of Degree of Separation

Figure 10:
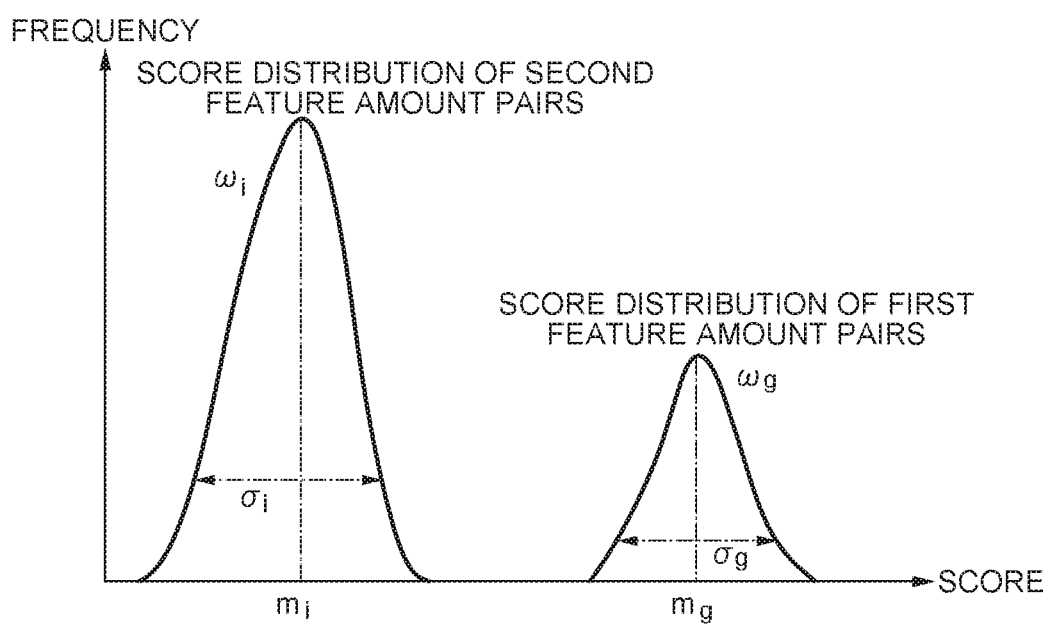
FIG. 10 is a diagram illustrating an exemplary scale of the degree of separation used in the individual identifying device according to the first exemplary embodiment of the present invention.

As illustrated in FIG. 10, a ratio of inter-class dispersion $\sigma_b^2$ to intra-class dispersion $\sigma_w^2$ is given by the expressions provided below, where regarding the distribution of scores of the first feature amount pairs (first distribution), $m_g$ represents an average, $\sigma_g$ represents dispersion, and $\omega_g$ represents the number of pairs thereof, and regarding the distribution of scores of the second feature amount pairs (second distribution), $m_i$ represents an average, $\sigma_i$ represents dispersion, and $\omega_i$ represents the number of pairs thereof.

$$\sigma_w^2 = (\omega_g \sigma_g^2 + \omega_i \sigma_i^2)/(\omega_g + \omega_i) \tag{1}$$

$$\sigma_b^2 = \omega_g \omega_i (m_g - m_i^2)/(\omega_g + \omega_i)^2 \tag{2}$$

Then, a ratio of inter-class dispersion to intra-class dispersion, given by the expression provided below, can be used as a measure of the degree of separation.

$$\text{Degree of separation} = \text{a ratio of inter-class dispersion to intra-class dispersion} = \sigma_b^2/\sigma_w^2 \tag{3}$$

Example 2 of Measure of Degree of Separation

Figure 11:
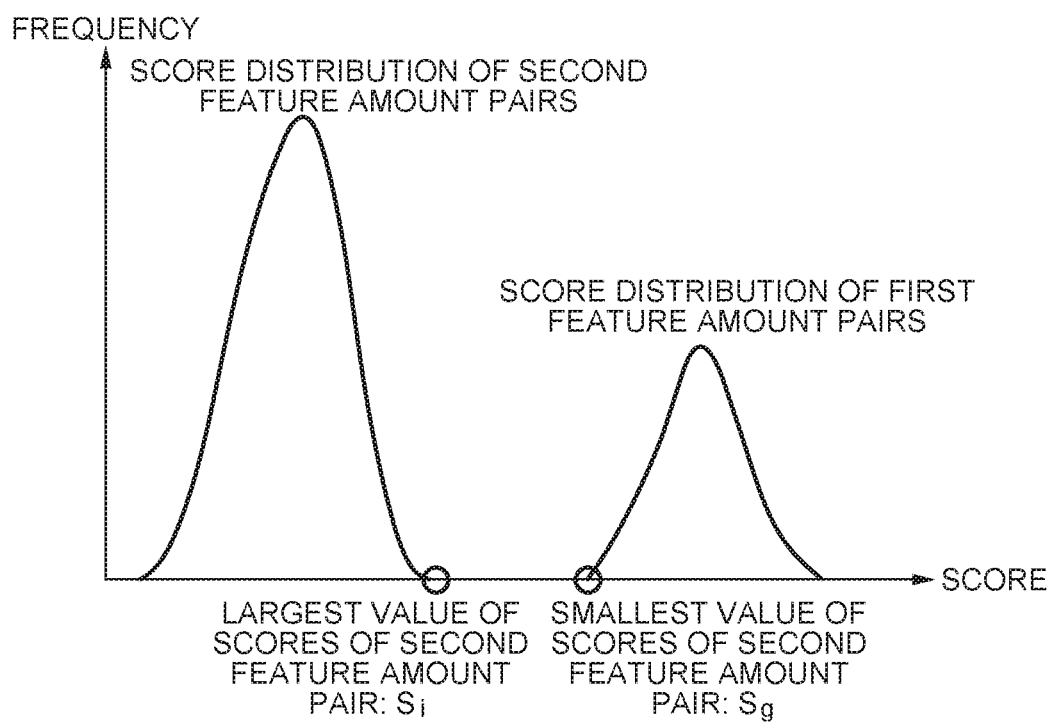
FIG. 11 is a diagram illustrating another exemplary scale of the degree of separation used in the individual identifying device according to the first exemplary embodiment of the present invention.

As illustrated in FIG. 11, the ratio of a largest value $S_i$ to a smallest value $S_g$, given by the expression provided below, can be used as a measure of the degree of separation, where $S_g$ represents a smallest value of distribution of scores of the first feature amount pairs (first distribution) and $S_i$ represents a largest value of distribution of scores of the second feature amount pairs (second distribution).

$$\text{Degree of separation} = \text{ratio of largest value of second distribution to smallest value of first distribution} = S_i/S_g \tag{4}$$

Example 3 of Measure of Degree of Separation

Figure 12A:
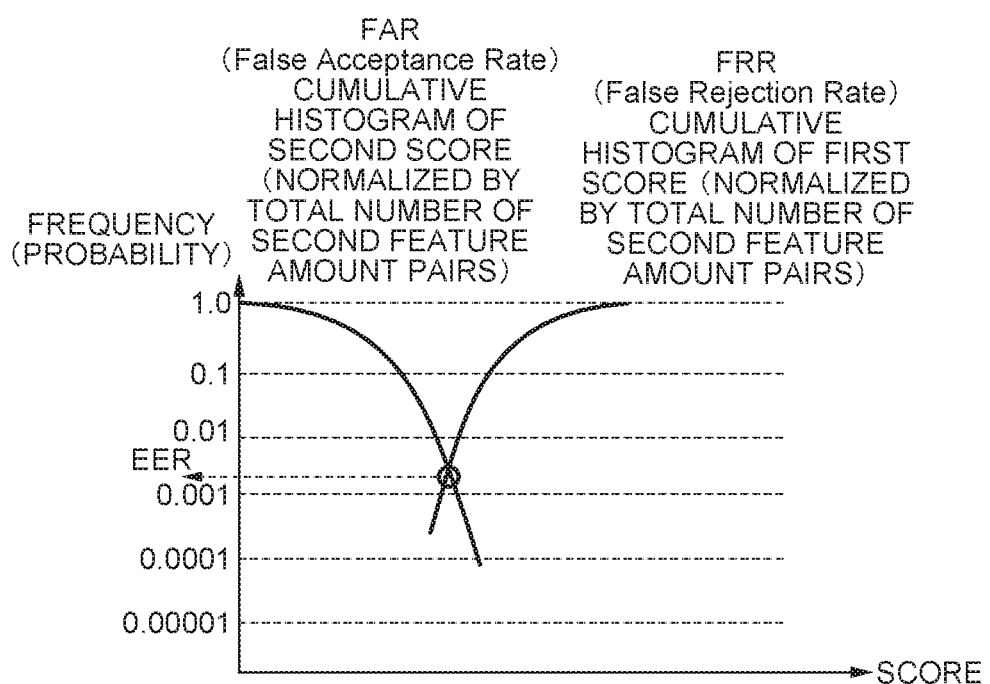
FIG. 12A is a diagram illustrating still another exemplary scale of the degree of separation used in the individual identifying device according to the first exemplary embodiment of the present invention.
Figure 12B:
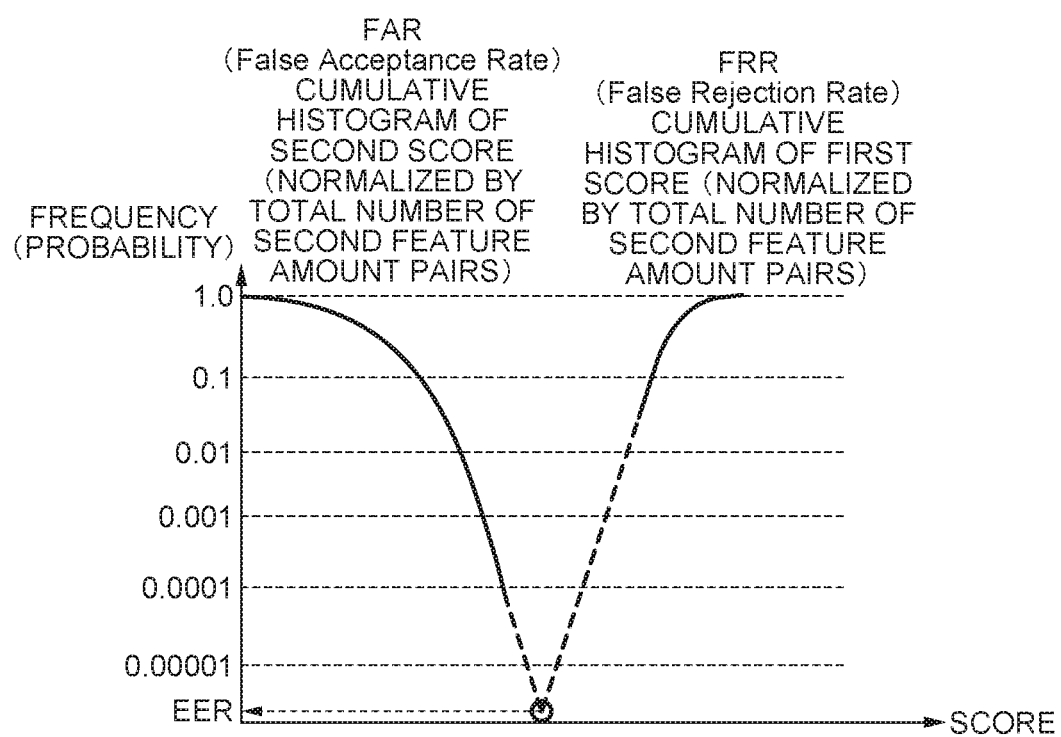
FIG. 12B is a diagram illustrating still another exemplary scale of the degree of separation used in the individual identifying device according to the first exemplary embodiment of the present invention.

An equal error rate (EER) in which a false rejection rate (FRR) obtained from the distribution of scores of the first feature amount pairs and a false acceptance rate (FAR) obtained from the distribution of scores of the second feature amount pairs become equal is used as a measure of the degree of separation. For example, the FRR can be obtained as a cumulative histogram of scores of the first feature amount pairs (normalized by the total number of the first feature amount pairs), as illustrated in FIG. 12A. Also, the FAR can be obtained as a cumulative histogram of scores of the second feature amount pairs (normalized by the total number of the second feature amount pairs), as illustrated in FIG. 12A. Furthermore, the EER can be obtained as frequency (probability) of intersection between the EER and FRR, as illustrated in FIG. 12A. Further, when the cumulative histogram of the first scores and the cumulative histogram of the second scores are completely separated, the EER can be calculated by extrapolation by the cumulative distribution function that approximates the respective cumulative histograms, as illustrated in FIG. 12B.

Then, the imaging parameter determination unit 113 compares the calculated degree of separation SP1 with a predetermined threshold to thereby determine whether or not the first distribution D11 based on the first feature amount pairs and the second distribution D12 based on the second feature amount pairs are separated from each other by the threshold or more (step S114). Then, when the degree of separation SP1 between the first distribution D11 and the second distribution D12 is equal to or larger than the threshold, the imaging parameter determination unit 113 stores the value a1 of the imaging parameter A at that time in the imaging parameter storage unit 114, and ends the process illustrated in FIG. 4.

On the other hand, when the degree of separation SP1 between the first distribution D11 and the second distribution 12 is smaller than the threshold, the imaging parameter determination unit 113 determines that the N pieces of sample objects cannot be distinguished from each other under the imaging condition of the candidate value a1 of the imaging parameter A at that time. Then, the imaging parameter determination unit 113 increments the variable i (step S115) and confirms that i is not larger than n, and returns to step S102. Thereby, the process similar to that described above is repeated with the value of the imaging parameters A being fixed to a candidate value a2 (steps S102 to S114).

Thereafter, the process illustrated in FIG. 4 is performed until either one of the following conditions is first established: a candidate value of the imaging parameter A in which the degree of separation between the first distribution and the second distribution becomes the threshold or larger is found, or the variable i becomes larger than n. Note that when a candidate value of the imaging parameter A in which the degree of separation becomes the threshold or larger is not found until the variable i becomes larger than n, the imaging parameter determination unit 113 outputs an error message (step S118), and ends the process illustrated in FIG. 4.

Figure 13:
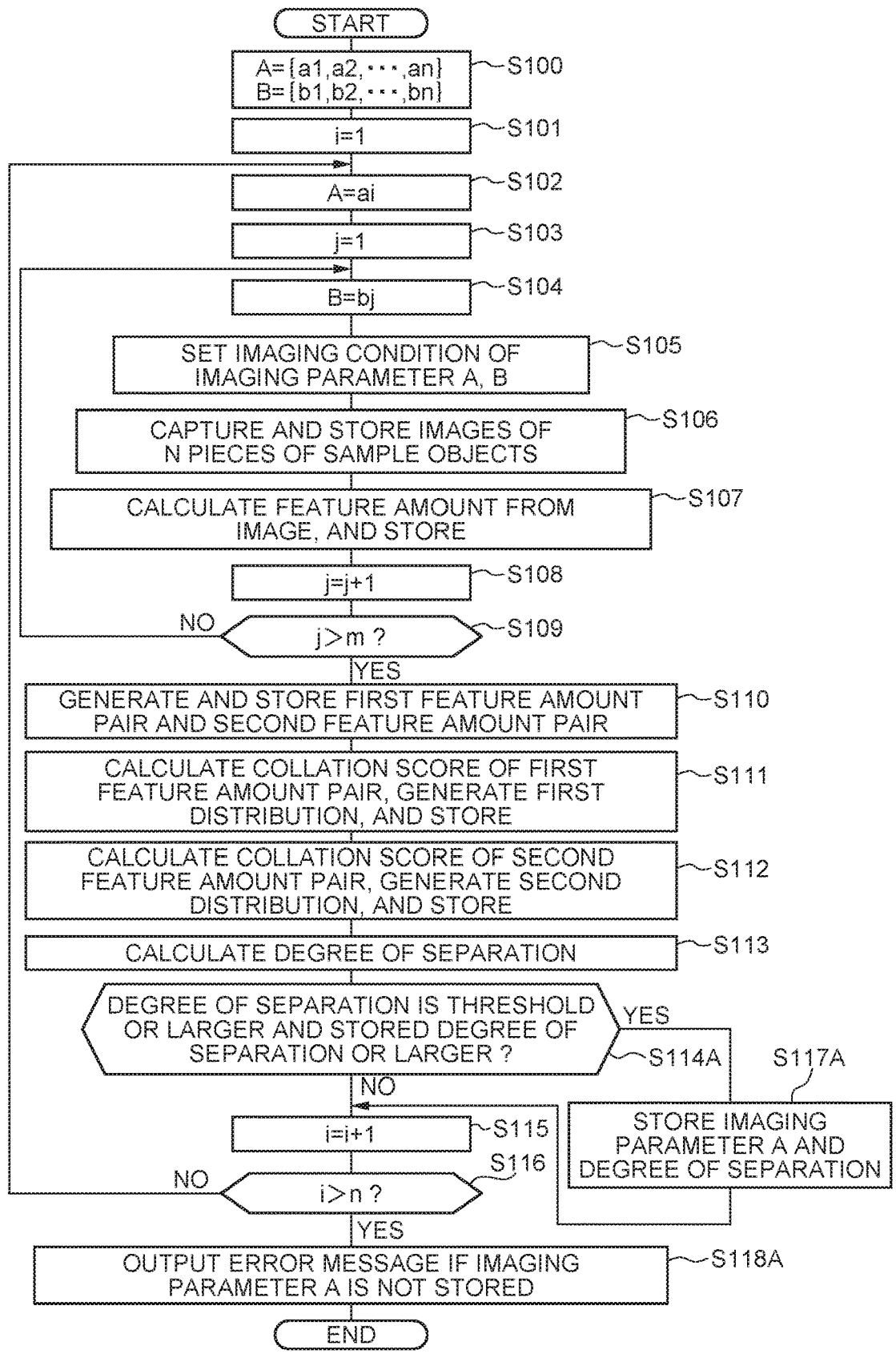
FIG. 13 is a flowchart illustrating another exemplary process of determining a value of a specific imaging parameter in the individual identifying device according to the first exemplary embodiment of the present invention.

FIG. 13 is a flowchart illustrating another example of a process of determining the value of a specific imaging parameter A. Compared with the process illustrated in FIG. 4, the process illustrated in FIG. 13 differs from the process of FIG. 4 in that steps S114, S117, and S118 are replaced with steps S114A, S117A, and S118A. The other points are the same as those illustrated in FIG. 4.

At step S114A, the imaging parameter determination unit 113 determines whether or not the calculated degree of separation is equal to or larger than the threshold and is equal to or larger than the degree of separation of the imaging parameter A stored in the imaging parameter storage unit 114. When the calculated degree of separation is equal to or larger than the threshold and is equal to or larger than the degree of separation of the imaging parameter A stored in the imaging parameter storage unit 114, the imaging parameter determination unit 113 overwrites the value and the degree of separation of the imaging parameter A, stored in the imaging parameter storage unit 114, to the candidate value and the degree of separation of the current imaging parameter A (step S117A). Then, the imaging parameter determination unit 113 proceeds to step S115. Meanwhile, when the calculated degree of separation is not equal to or larger than the threshold or, even though it is equal to or larger than the threshold, when it is not equal to or larger than the degree of separation of the imaging parameter A stored in the imaging parameter storage unit 114, the imaging parameter determination unit 113 skips over step S117A and proceeds to step S115.

Then, when the imaging parameter determination unit 113 determines that the variable i becomes larger than n at step S116, the imaging parameter determination unit 113 outputs an error message if the value of the imaging parameter A is not stored in the imaging parameter storage unit 114 (step S118A), and ends the process of FIG. 13. If the value of the imaging parameter A is stored in the imaging parameter storage unit 114, the value of the stored imaging parameters A becomes the value of the imaging parameters A that is equal to or larger than the threshold and that gives a largest degree of separation.

[Operation of Individual Registration]

Next, operation of individual registration for registering each object to be managed will be described.

Figure 14:
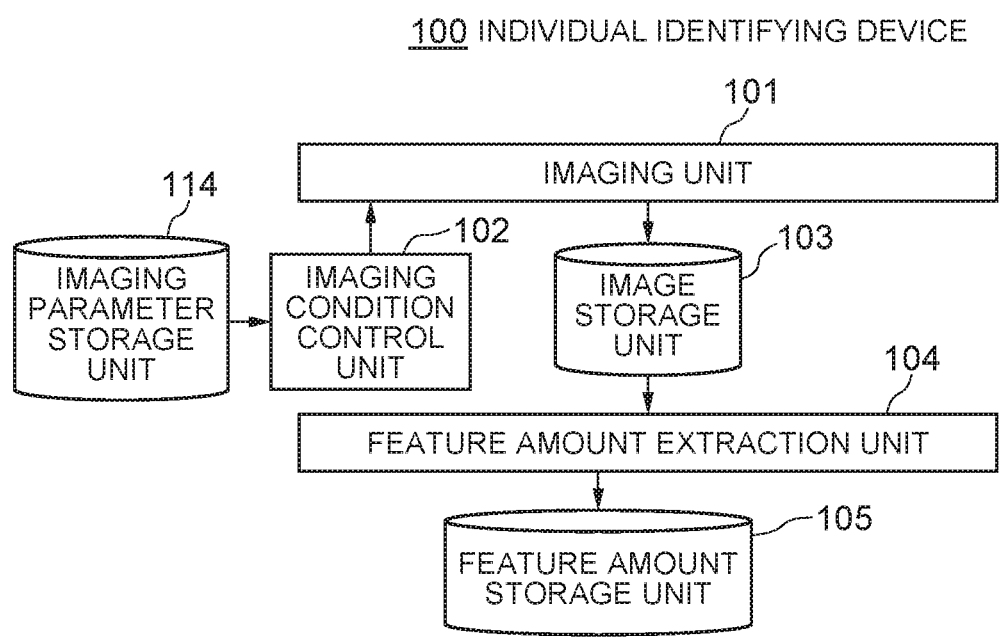
FIG. 14 is an operational flow of an example of individual registration in the individual identifying device according to the first exemplary embodiment of the present invention.
Figure 15:
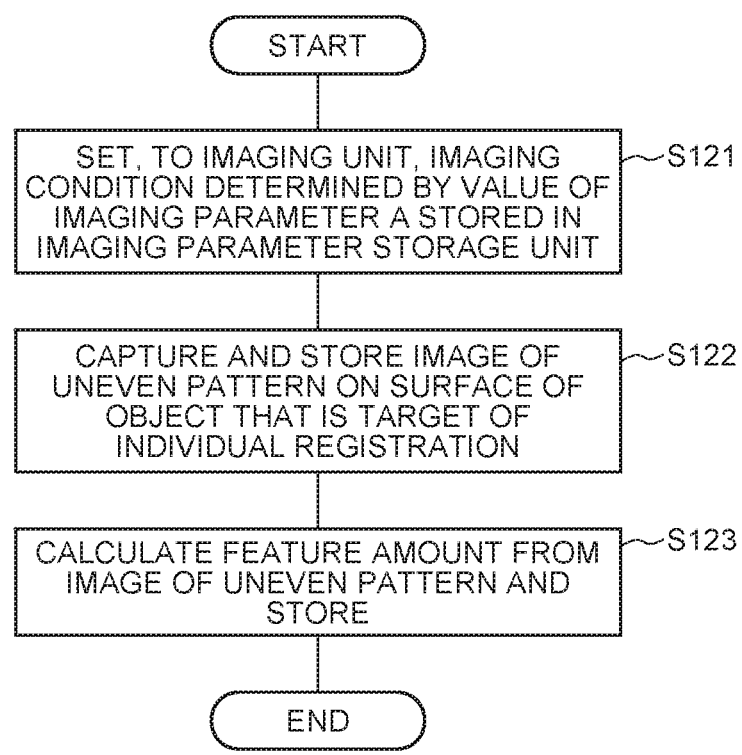
FIG. 15 is a flowchart illustrating an example of individual registration in the individual identifying device according to the first exemplary embodiment of the present invention.

FIGS. 14 and 15 are a process flow and a flowchart of an operation of individual registration. First, the imaging condition control unit 102 reads the value of the imaging parameter A determined by the operation of the above-described pre-processing from the imaging parameter storage unit 114, and sets the imaging condition determined by the value of the imaging parameter A to the imaging unit 101 (step S121). For example, in the case where the imaging unit 101 uses the imaging aid described in Patent Document 1 and the height of the side surface of the covering portion is stored in the imaging parameter storage unit 114 as the value of the imaging parameter A, the imaging condition control unit 102 performs adjustment so that the height of the side surface of the covering portion matches the value of the imaging parameter A. Setting of the imaging condition to the imaging unit 101 may be automated or may be set manually by the user by displaying the imaging condition on the screen display unit 153.

Next, the imaging unit 101 captures an image of an uneven pattern of one or more objects that are targets of individual registration at least once each under the imaging condition set, and stores in the image storage unit 103 (step S122).

Then, the feature amount extraction unit 104 reads the images of the uneven patterns on the surfaces of one or more objects that are targets of individual registration stored in the image storage unit 103, extracts the feature amount from each of the images, and stores is in the feature amount storage unit 105 (step S123). At this time, the feature amount storage unit 105 registers the individual unique feature amount by linking it with (in association with) information related to the object that is a registration target, such as individual ID number of the registration target, registration date, size, and product specification (also referred to as supplementary information). With this process, it is possible to present the individual management information of the object such as a product, on the basis of the determination result of individual identification and individual authentication described below.

FIG. 16 illustrates an example of contents of the individual registration information stored in the feature amount storage unit 105. The feature amounts PF1, PF2, . . . , PFn and supplementary information SI1, SI2, . . . , SIn are feature amounts and supplementary information corresponding one-to-one to the individual of a registration target.

[Operation of Individual Identification and Individual Collation]

Next, operation of identifying and collating individual objects to be managed will be described.

Figure 17:
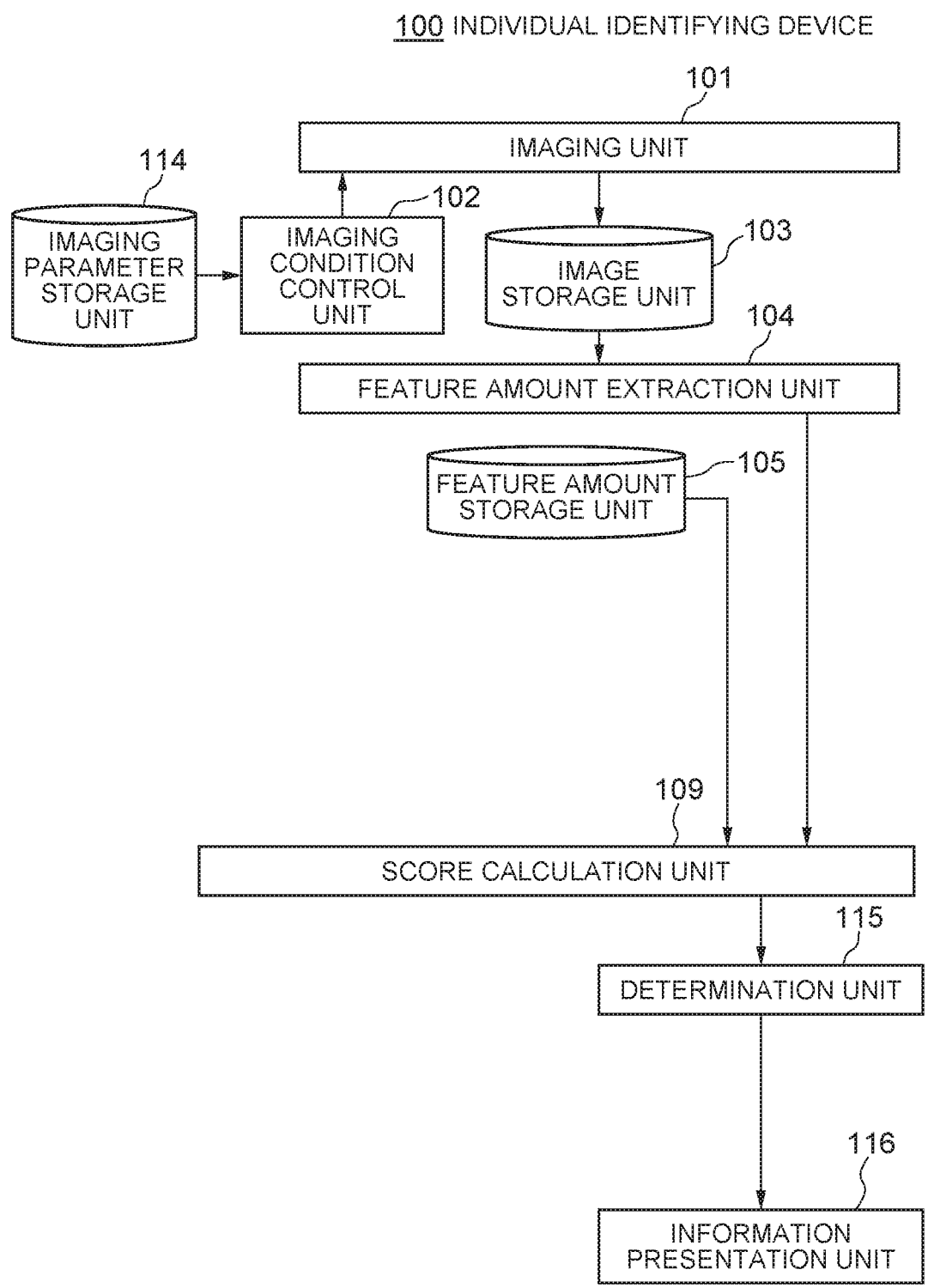
FIG. 17 is an operational flow of individual identification and individual collation in the individual identifying device according to the first exemplary embodiment of the present invention.
Figure 18:
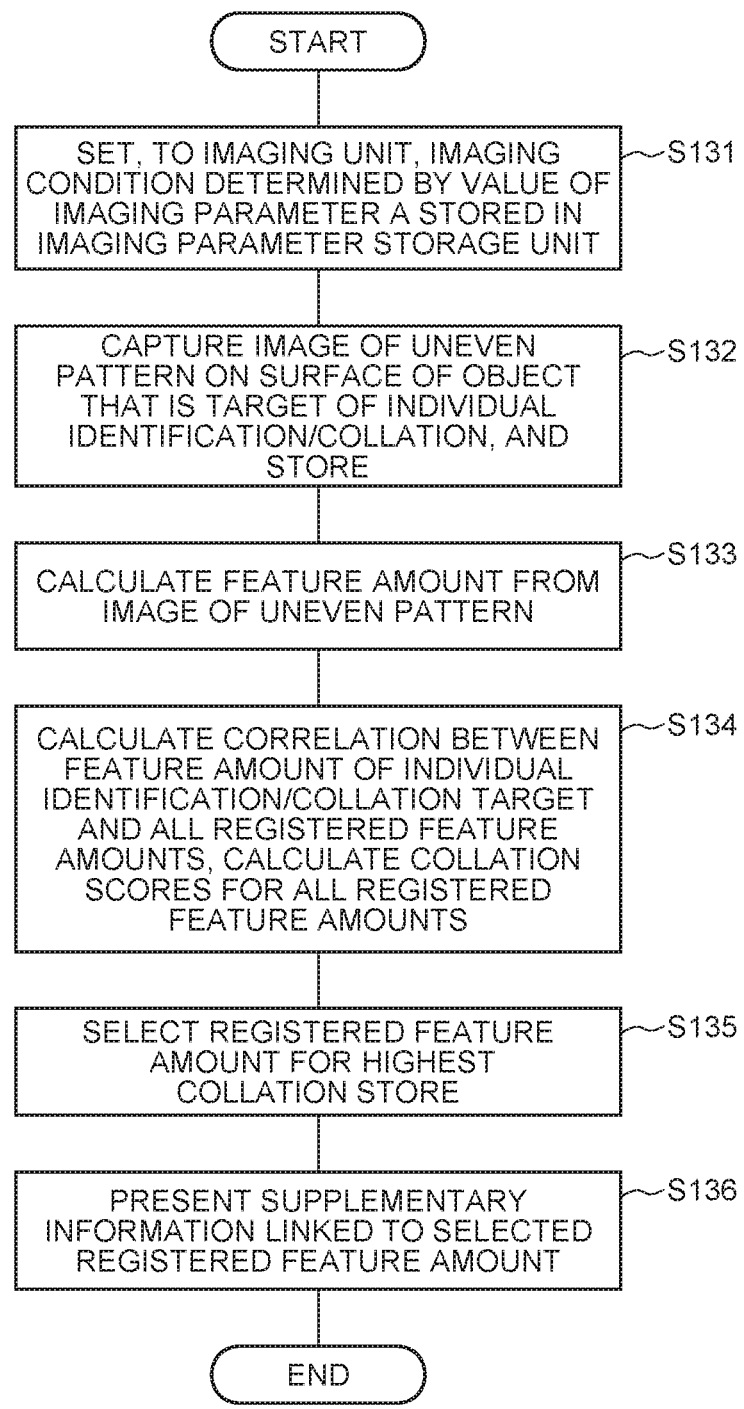
FIG. 18 is a flowchart illustrating an exemplary process of individual identification and individual collation in the individual identifying device according to the first exemplary embodiment of the present invention.

FIGS. 17 and 18 are a process flow and a flowchart illustrating an operation for individual identification and individual collation. First, the imaging condition control unit 102 reads the value of the imaging parameter A determined by the operation of the above-described pre-processing from the imaging parameter storage unit 114, and sets the imaging condition determined by the value of the imaging parameter A to the imaging unit 101 (step S131). For example, in the case where the imaging unit 101 uses the imaging aid described in Patent Document 1 and the height of the side surface of the covering portion is stored in the imaging parameter storage unit 114 as the value of the imaging parameter A, the imaging condition control unit 102 performs adjustment so that the height of the side surface of the covering portion matches the value of the imaging parameter A. Setting of the imaging condition to the imaging unit 101 may be automated or may be set manually by the user by displaying the imaging condition on the screen display unit 153.

Next, the imaging unit 101 captures an image of an uneven pattern of the object that is a target of individual identification and collation at least once under the imaging condition set, and stores it in the image storage unit 103 (step S132). Then, the feature amount extraction unit 104 reads the image of the uneven pattern on the surface of the object that is a target of individual identification and collation stored in the image storage unit 103, extracts the feature amount from the image, and outputs it to the score calculation unit 109 (step S133). Hereinafter, the feature amount output from the feature amount extraction unit 104 to the score calculation unit 109 at that time is referred to as a feature amount of an individual identification/collation object.

Then, the score calculation unit 109 calculates correlation between the feature amount of the individual identification/collation target and all of the feature amounts PF1 to PFn registered in the feature amount storage unit 105, and calculates collation scores with respect to all of the feature amounts PF1 to PFn (step S134). Then, on the basis of the collation scores calculated by the score calculation unit 109, the determination unit 115 determines the feature amount stored in the feature amount storage means 105 that matches the feature amount of the individual identification/collation target. For example, the determination unit 115 sorts the collation scores between the feature amount of the individual identification/collation target and all of the registered feature amount, and selects the feature amount in which the collation score is the largest (largest correlation) (step S135). Then, the determination unit 115 reads the supplementary information linked to the selected feature amount from the feature amount storage unit 105, and outputs it as product information of the product that is a target of identification and collation.

The determination unit 115 may determine whether or not the collation scores between the feature amount of the individual identification/collation target and all of the feature amounts stored in the feature amount storage unit 105 exceed a preset threshold. If none of the collation scores between the feature amount of the individual identification/collation target and all of the feature amounts stored in the feature amount storage unit 105 exceed the threshold, the determination unit 115 determines that the product that is a target of identification and collation is not registered, and outputs information representing an authentication error. The determination unit 115 that operates as described above can be used for individual authentication purpose such as authenticity determination of a management target.

Then, when the information presentation unit 116 receives product information or authentication error information from the determination unit 115, the information presentation unit 116 displays, on a display device not shown, product information and individual authentication information that are individual identification results of the product that is a target of identification and collation, or outputs them to an external terminal (step S136).

Next, a preferred exemplary configuration of the imaging unit 101 will be described.

Example 1 of Imaging Unit 101

Figure 19:
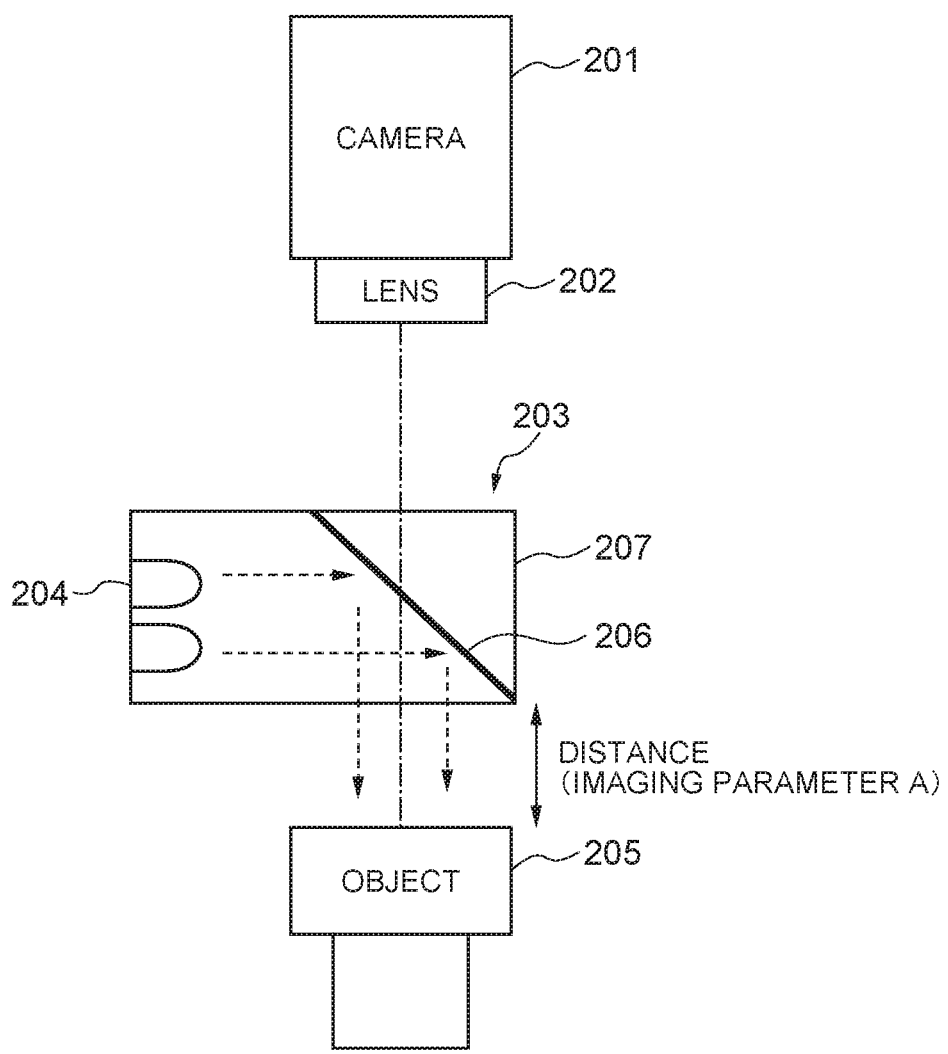
FIG. 19 is a side view illustrating an exemplary configuration of an imaging unit having a coaxial vertical illuminator to be used in the individual identifying device according to the first exemplary embodiment of the present invention.

FIG. 19 is a side view of an exemplary configuration of the imaging unit 101. The imaging unit 101 of this example includes a camera 201, a camera lens 202 mounted on the camera 201, and a coaxial vertical illuminator 203 of a box type.

The coaxial vertical illuminator 203 of a box type includes a light source 204 such as an LED, and a box 207 incorporating a beam splitter 206 that irradiates a surface of the object 205 with illumination light from the light source 204 along the optical axis of the camera lens 202. The light reflected at the surface of the object 205 passes through the beam splitter 206 and is made incident on the camera lens 202, and forms an image. The beam splitter 206 may be a half mirror.

Figure 20:
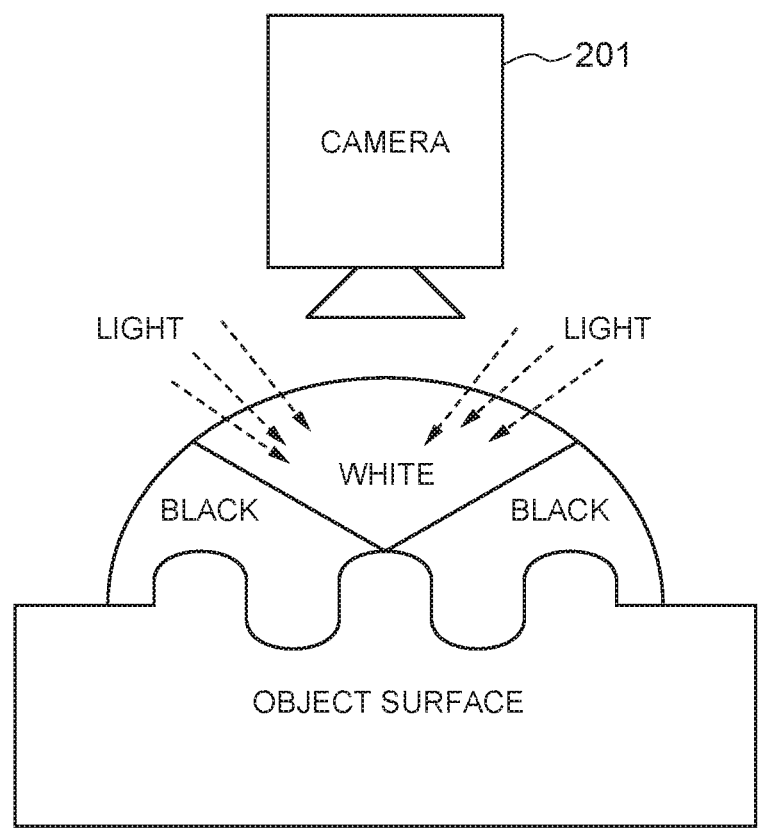
FIG. 20 is a diagram illustrating an example of imaging a surface, directly facing a camera, to be white (high brightness) by an imaging unit having a coaxial vertical illuminator to be used in the individual identification apparatus according to the first exemplary embodiment of the present invention.
Figure 21A:
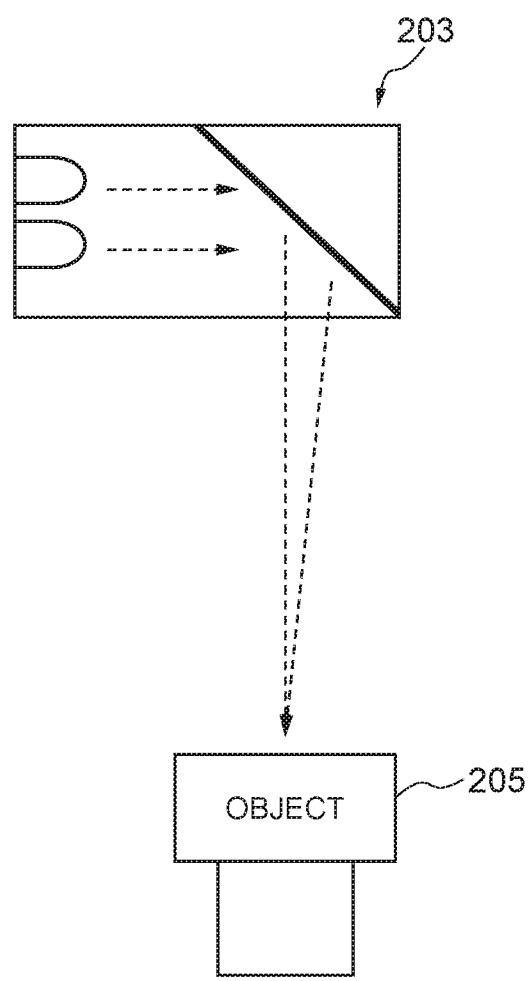
FIG. 21A is a diagram illustrating a state where light incident angle in a camera confronting direction can be adjusted by adjusting the distance from the coaxial vertical illuminator, to be used in the individual identifying device according to the first exemplary embodiment of the present invention, to a surface of an object.
Figure 21B:
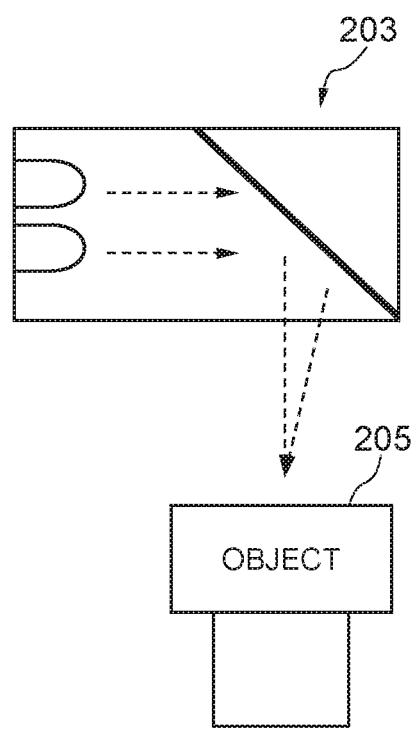
FIG. 21B is a diagram illustrating a state where light incident angle in a camera confronting direction can be adjusted by adjusting the distance from the coaxial vertical illuminator, to be used in the individual identifying device according to the first exemplary embodiment of the present invention, to a surface of an object.

According to the imaging unit 101 of FIG. 19 using the coaxial vertical illuminator 203 of a box type, the surface directly facing the camera, of the pattern formed on the surface of the object 205, can be imaged as white (high brightness), as illustrated in FIG. 20. By adjusting the distance from the coaxial vertical illuminator 203 to the surface of the object 205, it is possible to adjust the incident angle of light in the camera confronting direction. That is, as illustrated in FIG. 21A, when the distance from the coaxial vertical illuminator 203 to the surface of the object 205 is longer, parallelism of the illumination light is improved because the light does not spread, so that the angle of the white (high brightness) in FIG. 20 can be narrowed. On the other hand, as illustrated in FIG. 21B, when the distance from the coaxial vertical illuminator 203 to the surface of the object 205 is shorter, parallelism of the illumination light is lowered because the light spreads, so that the angle of the white (high brightness) in FIG. 20 can be widened. Therefore, in the imaging unit 101 using the coaxial vertical illuminator 203, the distance from the coaxial vertical illuminator 203 to the surface of the object 205 can be used as a specific imaging parameter A.

Further, by adjusting the size of the illumination of the coaxial vertical illuminator 203, it is possible to adjust the size of the surface of the corresponding object 205 and the incident angle of the light in the camera confronting direction. Therefore, in the imaging unit 101 using the coaxial vertical illuminator 203, a combination of the distance from the coaxial vertical illuminator 203 to the surface of the object 205 and the size of the illumination can be used as a specific imaging parameter A.

Example 2 of Imaging Unit 101

Figure 22:
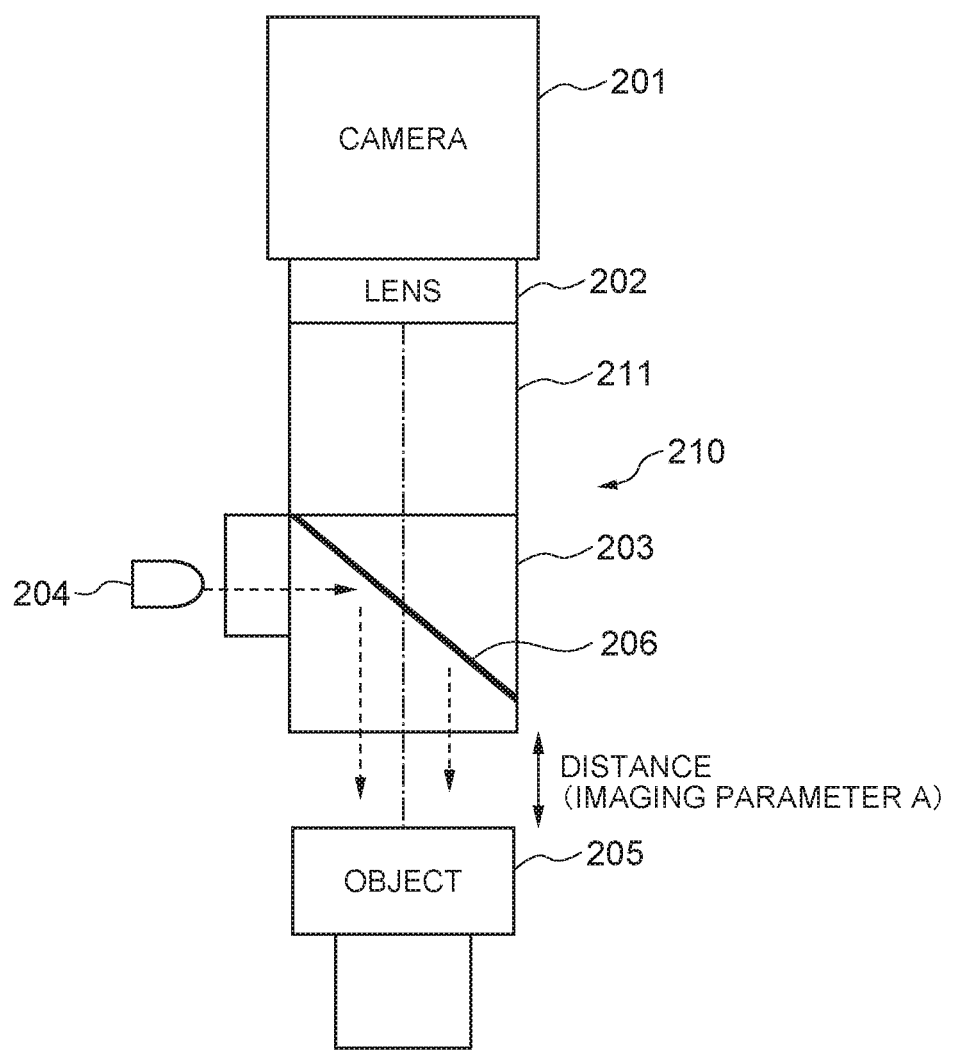
FIG. 22 is a side view illustrating an exemplary configuration of an imaging unit having a coaxial vertical illuminator of a barrel type to be used in the individual identifying device according to the first exemplary embodiment of the present invention.

FIG. 22 is a side view of another exemplary configuration of the imaging unit 101. The imaging unit 101 of this example includes the camera 201, the camera lens 202 mounted on the camera 201, and a coaxial vertical illuminator 210 of a lens-barrel type.

The coaxial vertical illuminator 210 of a lens-barrel type includes the light source 204 such as an LED, and a lens-barrel 211 incorporating the beam splitter 206 that irradiates a surface of the object 205 with illumination light from the light source 204 along the optical axis of the camera lens 202. The light reflected at the surface of the object 205 passes through the beam splitter 206 and is made incident on the camera lens 202, and forms an image. The beam splitter 206 may be a half mirror.

According to the coaxial vertical illuminator 210 of the lens-barrel type, the surface directly facing the camera, of the uneven pattern formed on the surface of the object 205, can be imaged as white (high brightness), as illustrated in FIG. 20. By adjusting the distance from the coaxial vertical illuminator 210 to the surface of the object 205, it is possible to adjust the incident angle of the light in the camera confronting direction. Therefore, in the imaging unit 101 using the coaxial vertical illuminator 210, the distance from the coaxial vertical illuminator 210 to the surface of the object 205 can be used as a specific imaging parameter A.

Further, by adjusting the size of the illumination of the coaxial vertical illuminator 210, it is possible to adjust the size of the surface of the corresponding object 205 and the incident angle of light in the camera confronting direction. Therefore, in the imaging unit 101 using the coaxial vertical illuminator 210, a combination of the distance from the coaxial vertical illuminator 210 to the surface of the object 205 and the size of the illumination can be used as a specific imaging parameter A.

Example 3 of Imaging Unit 101

Figure 23:
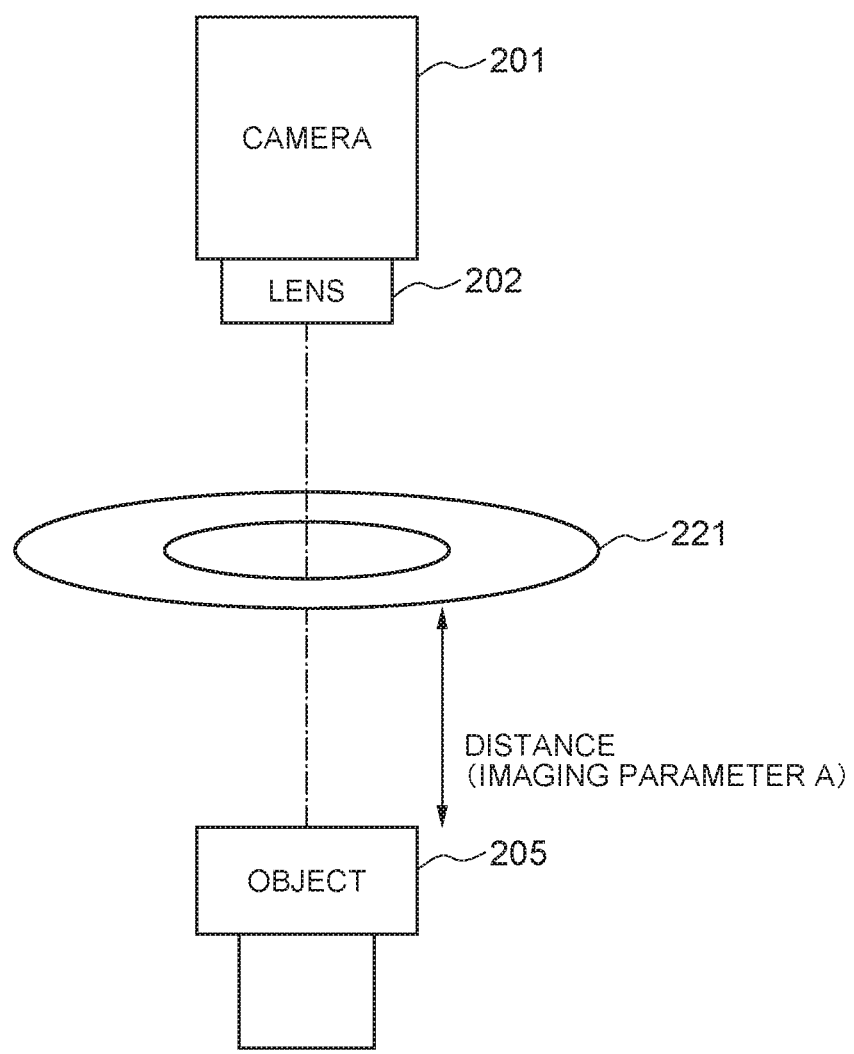
FIG. 23 is a side view illustrating an exemplary configuration of an imaging unit having a ring illuminator to be used in the individual identifying device according to the first exemplary embodiment of the present invention.

FIG. 23 is a side view of another exemplary configuration of the imaging unit 101. The imaging unit 101 of this example includes the camera 201, the camera lens 202 mounted on the camera 201, and a ring illuminator 221.

The ring illuminator 221 is literally a ring-shaped illuminator. The light emitted from the ring illuminator 221 and reflected at the surface of the object 205 passes through the cavity in the central portion of the ring illuminator 221 and is made incident on the camera lens 202, and forms an image.

Figure 24:
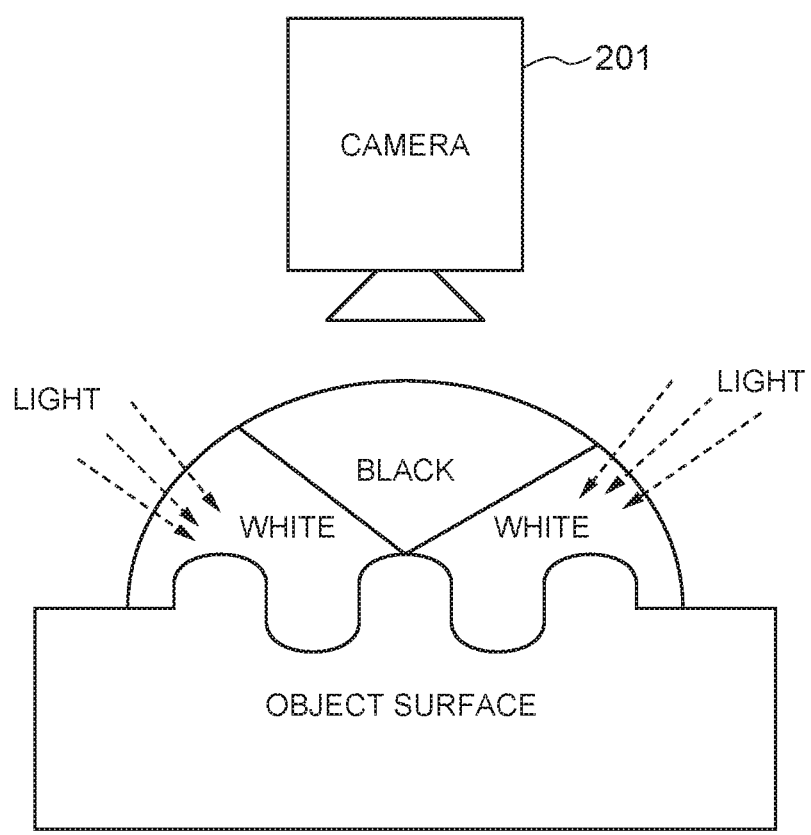
FIG. 24 is a diagram illustrating an example of imaging a surface, directly facing a camera, to be black (low brightness) by an imaging unit having a ring illuminator to be used in the individual identifying device according to the first exemplary embodiment of the present invention.

The ring illuminator 221 can realize illumination similar to coaxial vertical incident when a distance to the surface of the object 205 is long. As a result, the surface directly facing the camera, of the uneven pattern formed on the surface of the object 205, can be imaged as white (high brightness), as illustrated in FIG. 20. On the other hand, in the ring illuminator 221, an image having gradation opposite to that in the coaxial vertical incident is realized when a distance to the surface of the object 205 is short. That is, the surface directly facing the camera, of the uneven pattern formed on the surface of the object 205, can be imaged as black (low brightness), as illustrated in FIG. 24. By adjusting the distance from the ring illuminator 221 to the surface of the object 205, it is possible to adjust the incident angle of light in the camera confronting direction. Therefore, in the imaging unit 101 using the ring illuminator 221, the distance from the ring illuminator 221 to the surface of the object 205 can be used as a specific imaging parameter A.

Further, by adjusting the size of the illumination of the ring illuminator 221, it is possible to adjust the size of the surface of the corresponding object 205 and the incident angle of light in the camera confronting direction. Therefore, in the imaging unit 101 using the ring illuminator 221, a combination of the distance from the ring illuminator 221 to the surface of the object 205 and the size of the illumination can be used as a specific imaging parameter A.

Example 4 of Imaging Unit 101

Figure 25:
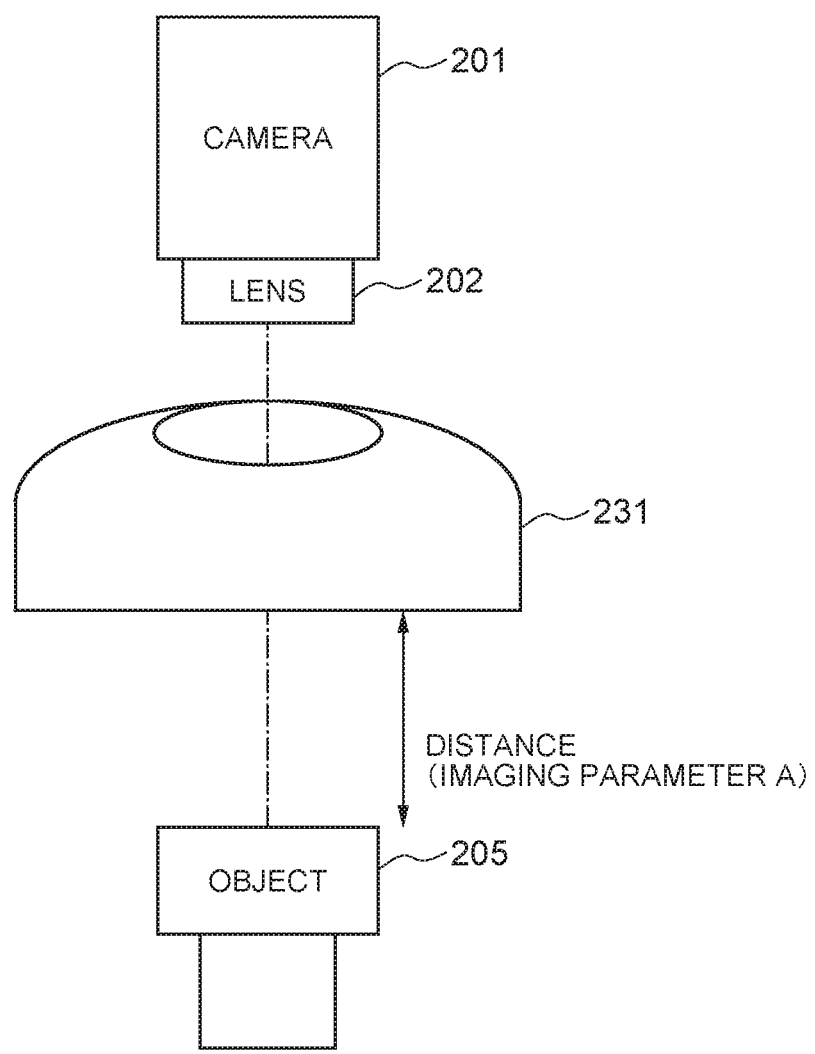
FIG. 25 is a side view illustrating an exemplary configuration of an imaging unit having a dome illuminator to be used in the individual identifying device according to the first exemplary embodiment of the present invention.

FIG. 25 is a side view of another exemplary configuration of the imaging unit 101. The imaging unit 101 of this example includes the camera 201, the camera lens 202 mounted on the camera 201, and a dome illuminator 231.

The dome illuminator 231 is literally a dome-shaped illuminator. The light emitted from the dome illuminator 231 and reflected at the surface of the object 205 passes through the cavity in the central portion of the dome illuminator 231 and is made incident on the camera lens 202, and forms an image.

According to the dome illuminator 231, the surface directly facing the camera, of the uneven pattern formed on the surface of the object 205, can be imaged as black (low brightness), as illustrated in FIG. 24. By adjusting the distance from the dome illuminator 231 to the surface of the object 205, it is possible to adjust the incident angle of light in the camera confronting direction. Therefore, in the imaging unit 101 using the dome illuminator 231, the distance from the dome illuminator 231 to the surface of the object 205 can be used as a specific imaging parameter A.

Further, by adjusting the size of the illumination of the dome illuminator 231, it is possible to adjust the size of the surface of the corresponding object 205 and the incident angle of light in the camera confronting direction. Therefore, in the imaging unit 101 using the dome illuminator 231, a combination of the distance from the dome illuminator 231 to the surface of the object 205 and the size of the illumination can be used as a specific imaging parameter A.

As described above, according to the present embodiment, it is possible to determine the imaging condition useful for identifying three or more types of objects that are similar to one another. This is because the present embodiment includes the imaging unit 101 that acquires a plurality of images by imaging each of N (N≥3) types of objects a plurality of times by setting the value of a specific imaging parameter A, among a plurality of types of imaging parameters, as a certain candidate value and changing the value of the remaining imaging parameter B, the feature amount extraction unit 104 that extracts a feature amount from each of the plurality of the images, the feature amount pair generation unit 106 that generates, as a first feature amount pair for each of the N types of objects, a feature amount pair in which two feature amounts constituting the feature amount pair are extracted from a plurality of images of objects of the same type, and generates, as a second feature amount pair for every combination of the N types of objects, a feature amount pair in which two feature amounts constituting the feature amount pair are extracted from a plurality of images of objects of the different types, the distribution generation unit 110 that generates a first distribution that is a distribution of collation scores of the first feature amount pairs and generates a second distribution that is a distribution of collation scores of the second feature amount pairs, and the imaging parameter determination unit 113 that determines the propriety of adopting the candidate value on the basis of the degree of separation between the first distribution and the second distribution.

Further, according to the present embodiment, identification and collation of collation target objects are performed by using an imaging condition useful for identifying three or more types of objects that are similar to one another. Therefore, there is no need to capture images of the collation target objects by changing the imaging condition for identification and collation as described in Patent Document 2. Therefore, it is possible to efficiently perform individual identification and individual collation.

Modification 1 of Present Embodiment

In the above description, two feature amounts constituting the first feature amount pair are feature amounts extracted from a plurality of images captured on the physically same object. Moreover, in the above description, two feature amounts constituting the second feature amount pair are feature amounts extracted from a plurality of images captured on physically different objects. In contrast, as a modification of the present embodiment, two feature amounts constituting the first feature amount pair may be feature amounts extracted from a plurality of images captured on the physically same object or physically different objects manufactured on the same production line or by the same manufacturing mold, and two feature amounts constituting the second feature amount pair may be feature amounts extracted from a plurality of images captured on physically different objects manufactured on different production lines or by different manufacturing molds.

Here, the manufacturing mold means a mold or cutting equipment used to manufacture products by casting, forging, cutting or the like. Further, the production line means a process of manufacturing products using one or more manufacturing molds in an assembly line.

For example, it is assumed that products are mass-produced by casting or forging with use of a manufacturing mold X1, and in parallel with it, products are mass-produced by casting or forging with use of a manufacturing mold X2 that is the same as the manufacturing mold X1. In that case, on the products manufactured by the manufacturing mold X1, a pattern unique to the manufacturing mold X1 is transferred to the entire surface. Also, on the products manufactured by the manufacturing mold X2, a pattern unique to the manufacturing mold X2 is transferred to the entire surface.

Further, it is also assumed that products are mass-produced by cutting a material with use of a cutting device Y1, and in parallel with it, products are mass-produced by cutting a material with use of a cutting device Y2 that is the same as the cutting device Y1, for example. In that case, in the products manufactured by the cutting device Y1, fine irregularities in surface roughness, that are unique to the blade used for cutting of the cutting device Y1, appear on the cut surface. Also, in the products manufactured by the cutting device Y2, fine irregularities in surface roughness, that are unique to the blade used for cutting of the cutting device Y2, appear on the cut surface. The same machining method and the devices mentioned here are only examples. Other same manufacturing steps and devices may also be handled similarly.

According to the present modification, it is possible to determine the imaging condition useful for identifying the production line or the manufacturing mold used for manufacturing the object. Further, the feature amount extracted from an image obtained by capturing an object under the determined imaging condition is unique to the production line or the manufacturing mold used for manufacturing the object. Accordingly, by using such a feature amount for identification and collation, it is possible to perform identification and collation of a product to know the production line or the manufacturing mold used for manufacturing the product.

Second Exemplary Embodiment

Figure 26:
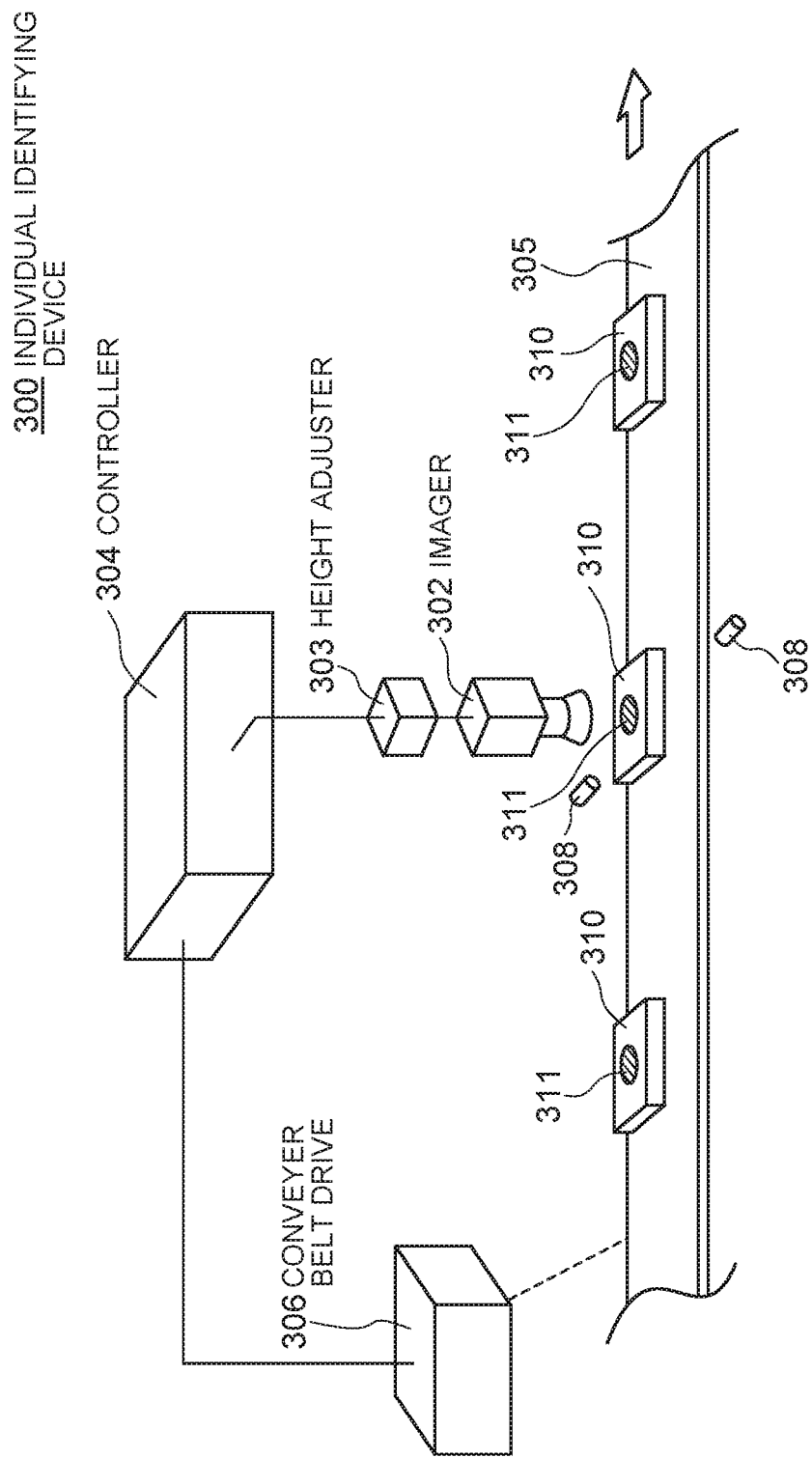
FIG. 26 is a block diagram of an individual identifying device according to a second exemplary embodiment of the present invention.

Referring to FIG. 26, an individual identifying device 300 according to a second exemplary embodiment of the present invention acquires an image of an uneven pattern 311 formed on a surface of an object 310 for each feed pitch on the upper surface of a conveyor belt 305. The object 310 is a metal part manufactured on a manufacturing line for metal lathe processing, or the like, for example, and has a fine uneven pattern 311 that is unique to the object and is formed on a head surface of the object 310. The conveyor belt 305 is also referred to as a conveyance path.

The individual identifying device 300 includes an imager 302, a height adjuster 303, a controller 304, a conveyor belt drive 306, and an optical switch 308. The imager 302 is disposed above the conveyor belt 305. The height of the imager 302, that is, the distance from the imager 302 to the object 310 on the conveyor belt 305 immediately below it is adjustable by the height adjuster 303.

The conveyor belt drive 306 is configured of a stepping motor for pitch-feeding the conveyor belt 305, or the like. The optical switch 208 is a sensor that detects whether or not the object 310 is present on the conveyor belt 305 immediately below the imager 302.

The imager 302 is a unit that acquires an image of the uneven pattern 311 on the surface of the object 310 on the conveyor belt 305 positioned immediately below the imager 302. The imager 302 may be configured of the camera 201, the camera lens 202, and the coaxial vertical illuminator 203 of a box type as illustrated in FIG. 19. Alternatively, the imager 302 may be configured of the camera 201, the camera lens 202, and the coaxial vertical illuminator 210 of a mirror-barrel type as illustrated in FIG. 22. Alternatively, the imager 302 may be configured of the camera 201, the camera lens 202, and the ring illuminator 221 as illustrated in FIG. 23. Alternatively, the imager 302 may be configured of the camera 201, the camera lens 202, and the dome illuminator 231 as illustrated in FIG. 25.

The controller 304 is a unit that controls the entire individual identifying device 300. The controller 304 is connected with the imager 302, the height adjuster 303, the conveyor belt drive 306, and the optical switch 308 in a wired or wireless manner, and transmits a command thereto to thereby control the operation thereof, or receives a signal therefrom. The controller 304 has respective functions of the imaging condition control unit 102, the image storage unit 103, the feature amount extraction unit 104, the feature amount storage unit 105, the score calculation unit 109, the determination unit 115, the information presentation unit 116, and the imaging parameter storage unit 114 in FIG. 1 of the first exemplary embodiment.

Next, operation of the individual identifying device 300 according to the present embodiment will be described with reference to the drawings. Operation of the individual identifying device 300 is roughly divided into two as described below.
(b) Operation of individual registration
(c) Operation of individual identification and individual collation
[Operation of Individual Registration]
First, operation of individual registration for registering each object to be managed will be described. When the operation of individual registration is performed, on the conveyor belt 305, the objects 310 that are targets of individual registration are placed at predetermined intervals on the conveyor belt 305.

Figure 27:
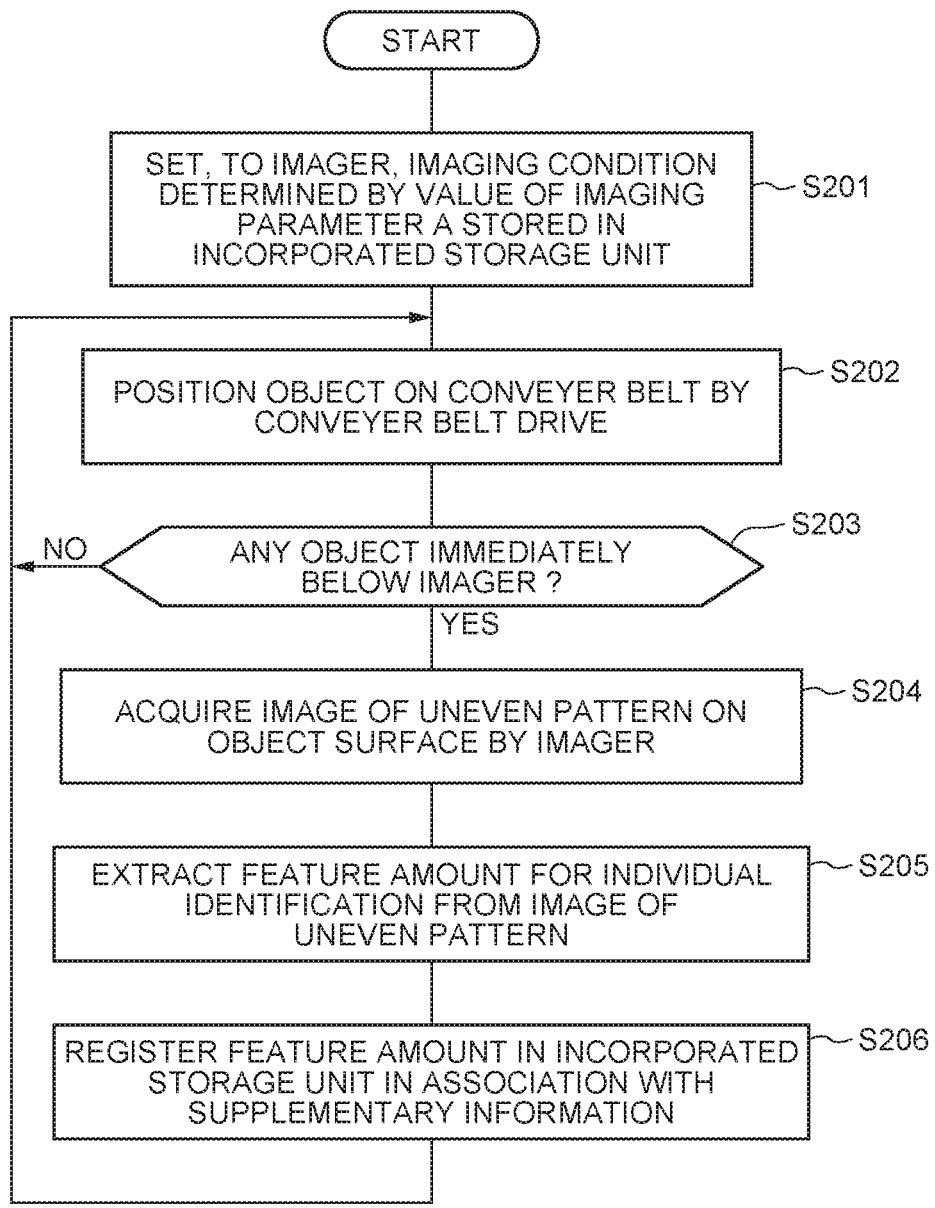
FIG. 27 is a flowchart illustrating an exemplary operation of individual registration in the individual identifying device according to the second exemplary embodiment of the present invention.

FIG. 27 is a flowchart of an operation of individual registration. First, the controller 304 sets an imaging condition determined by the value of the imaging parameter A stored in the storage unit incorporated therein, to the imager 302 (step S201). Here, the value of the imaging parameter A is determined in advance by an operation similar to the operation of pre-processing in the first exemplary embodiment, and is stored in the storage unit of the controller 304. That is, the stored value of the imaging parameter A is a value useful for identifying three or more types of objects that are similar to one another.

For example, when the imager 302 is an imager that uses the coaxial vertical illuminator 203 of a box type as illustrated in FIG. 19, the controller 304 adjusts the height of the imager 302 by the height adjuster 303 such that the distance from the coaxial vertical illuminator 203 to the surface of the object 310 matches the value of the imaging parameter A.

Then, the controller 304 issues a command to the conveyor belt drive 306 to drive the conveyor belt 305 by one pitch (S202). Then, the controller 304 detects whether or not the object 310 is positioned immediately below the imager 302 on the basis of a signal received from the optical switch 308 (step S203). When the object 310 is not positioned immediately below the imager 302, the controller 304 returns to step S202 and repeats the same operation as described above.

On the other hand, when the object 310 is positioned immediately below the imaging unit 302, the controller 304 issues a command to the imager 302 to acquire an image of the uneven pattern on the surface of the object 310 (step S204). Then, the controller 304 extracts a feature amount for individual identification from the acquired image of the uneven pattern (step S205). Then, the controller 304 registers the extracted feature amount in the storage unit incorporated therein, in association with supplementary information of the object 310 (step S206). Then, the controller 304 returns to step S202, and repeats the same operation as described above.

[Operation of Individual Identification and Individual Collation]

Next, operation of identifying and collating each object to be managed will be described. When the operation of individual identification and individual collation is performed, the objects 310 that are targets of individual identification and individual collation are placed at predetermined intervals on the conveyor belt 305.

Figure 28:
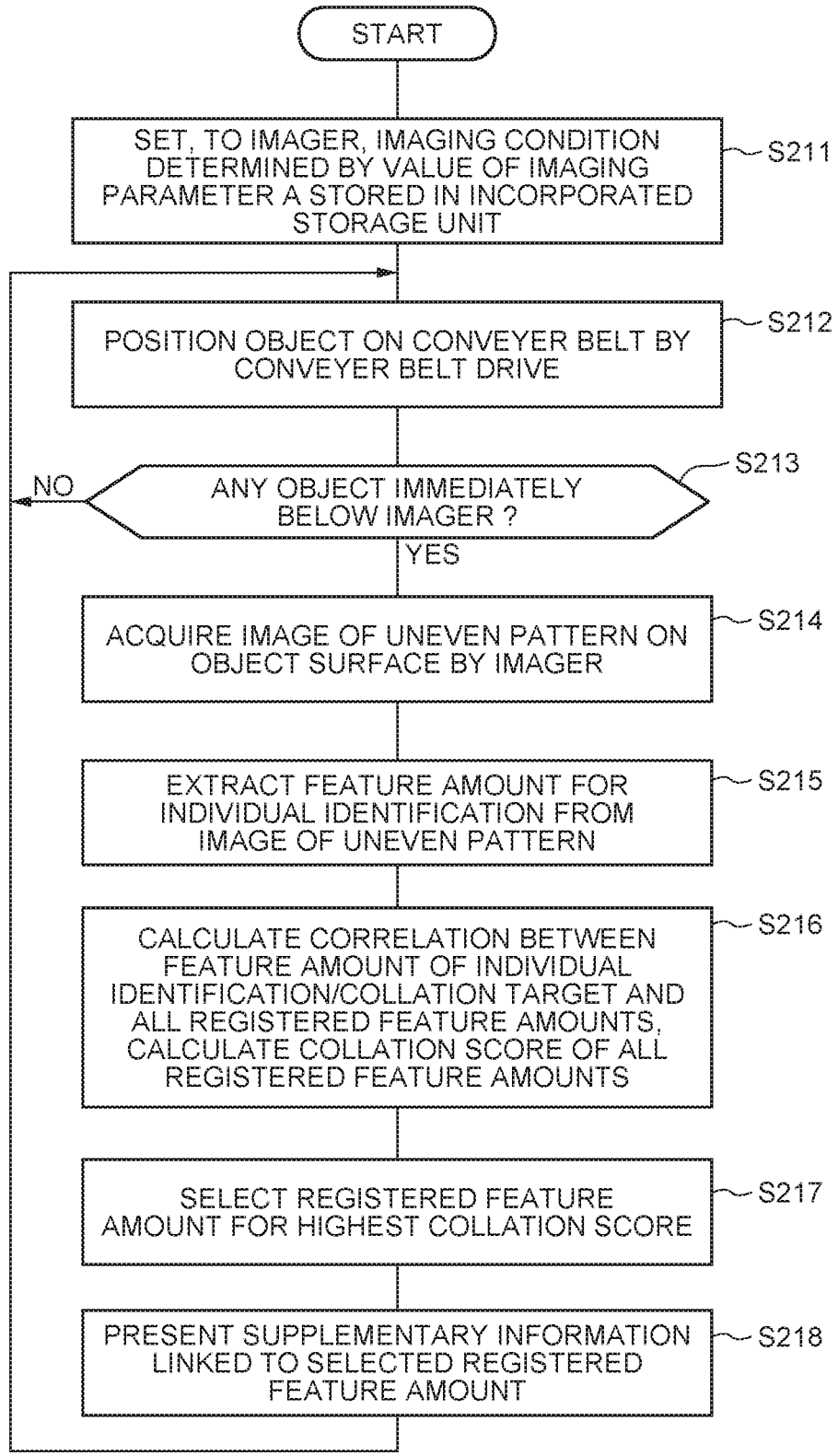
FIG. 28 is a flowchart illustrating an exemplary operation of individual identification and individual collation in the individual identifying device according to the second exemplary embodiment of the present invention.

FIG. 28 is a flowchart of an operation of individual identification and individual collation. First, the controller 304 sets an imaging condition determined by the value of the imaging parameter A stored in the storage unit incorporated therein, to the imager 302 (step S211). Then, the controller 304 issues a command to the conveyor belt drive 306 to drive the conveyor belt 305 by one pitch (S212). Then, the controller 304 detects whether or not the object 310 is positioned immediately below the imager 302, on the basis of a signal received from the optical switch 308 (step S213). Then, when the object 310 is not positioned immediately below the imager 302, the controller 304 returns to step S212 and repeats the same operation as described above. On the other hand, when the object 310 is positioned immediately below the imager 302, the controller 304 issues a command to the imager 302 to acquire an image of the uneven pattern on the surface of the object 310 (step S214). Next, the controller 304 extracts a feature amount for individual identification from the acquired image of the uneven pattern (step S215). The operation of steps S211 to S215 described above are the same as steps S201 to S205 of the operation of individual registration.

Next, the controller 304 calculates correlations between the feature amount of the target of individual identification/collation extracted at step S215 and all of the feature amounts registered in the storage unit incorporated therein, and calculates collation scores with respect to all of the registered feature amounts (step S216). Then, the controller 304 sorts the collation scores between the feature amount of the target of individual identification/collation and all of the registered feature amounts, and selects a feature amount in which the collation score is the largest (highest correlation) (step S217). Then, controller 304 reads the supplementary information linked to the selected feature amount from the storage unit, and outputs it as product information of the product that is a target of identification and collation (step S218).

The controller 304 may determine whether or not the collation scores between the feature amount of the target of individual identification/collation and all of the registered feature amounts exceed a preset threshold. If none of the collation scores between the feature amount of the target of individual identification/collation and all of the registered feature amounts exceed the threshold, the controller 304 determines that the product that is a target of identification and collation is not registered, and outputs information representing an authentication error. The controller 304 that operates as described above can be used for individual authentication purpose such as authenticity determination of a management target.

Third Exemplary Embodiment

Figure 29:
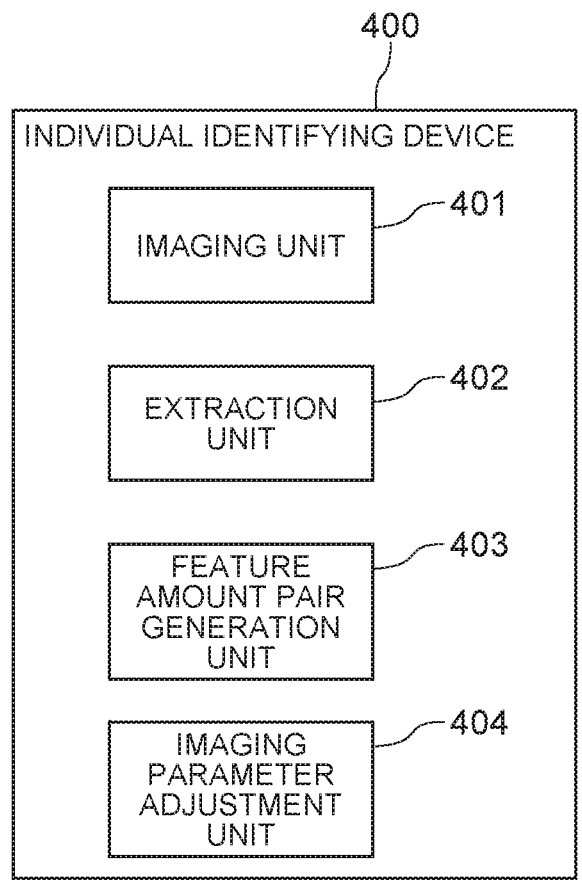
FIG. 29 is a block diagram of an individual identifying device according to a third exemplary embodiment of the present invention.

Referring to FIG. 29, an individual identifying device 400 according to a third exemplary embodiment of the present invention includes an imaging unit 401, an extraction unit 402, a feature amount pair generation unit 403, and an imaging parameter adjustment unit 404.

The imaging unit 401 has a function of acquiring a plurality of images obtained by imaging each of the N (N≥3) types of objects a plurality of times by setting the value of a specific imaging parameter, among a plurality of types of imaging parameters, as a certain candidate value and changing the value of the remaining imaging parameter. The imaging unit 401 may have a configuration similar to that of the imaging unit 101 and the imaging condition control unit 102 of FIG. 1, for example. However, it is not limited thereto. The extraction unit 402 has a function of extracting a feature amount from each of the images acquired by the imaging unit 401. The extraction unit 402 may have a configuration similar to that of the feature amount extraction unit 104 of FIG. 1, for example. However, it is not limited thereto. The feature amount pair generation unit 403 has a function of generating, as a first feature amount pair for each of N types of objects, a feature amount pair in which two feature amounts constituting the pair are extracted from a plurality of images of objects of the same type, and generating, as a second feature amount pair for every combination of N types of objects, a feature amount pair in which two feature amounts constituting the pair are extracted from a plurality of images of objects of different types. The feature amount pair generation unit 403 may have a configuration similar to that of the feature amount pair generation unit 106 of FIG. 1, for example. However, it is not limited thereto. The imaging parameter adjustment unit 404 has a function of generating a first distribution that is a distribution of collation scores of the first feature amount pairs, generating a second distribution that is a distribution of collation scores of the second feature amount pairs, and on the basis of the degree of separation between the first distribution and the second degree, determining the propriety of adopting the candidate value. The imaging parameter adjustment unit 404 may have a configuration similar to that of the imaging parameter determination unit 113 of FIG. 1, for example. However, it is not limited thereto.

Figure 30:
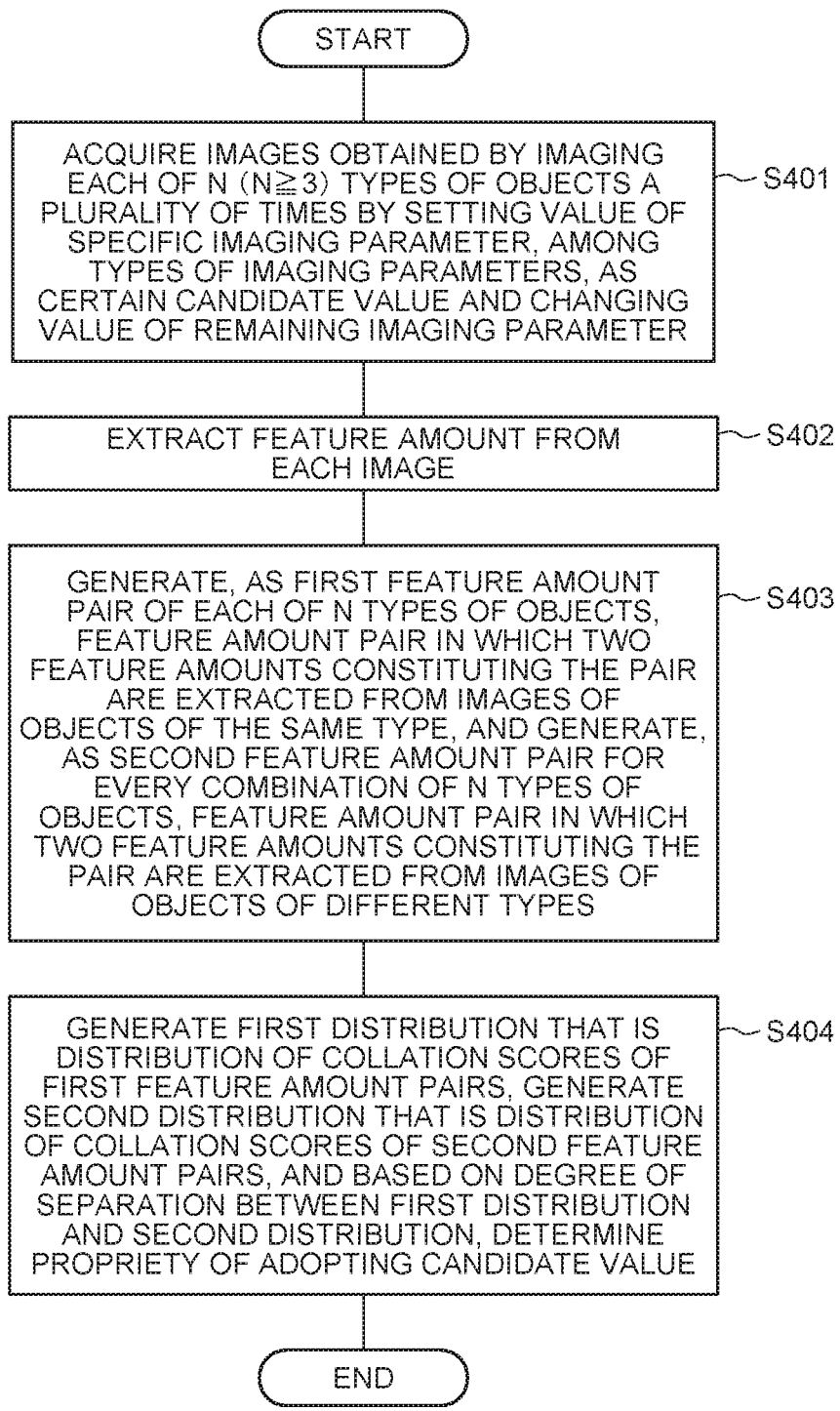
FIG. 30 is a flowchart illustrating an exemplary operation of the individual identifying device according to the third exemplary embodiment of the present invention.

FIG. 30 is a flowchart illustrating an operation of the individual identifying device 400 according to the present embodiment. Hereinafter, the individual identifying device 400 according to the present embodiment will be described with reference to FIG. 30.

First, the imaging unit 401 acquires a plurality of images obtained by imaging each of the N (N≥3) types of objects a plurality of times by setting the value of a specific imaging parameter, among a plurality of types of imaging parameters, as a certain candidate value and changing the value of the remaining imaging parameter (step S401). Then, the extraction unit 402 extracts a feature amount from each of the images acquired by the imaging unit 401 (step S402). Then, the feature amount pair generation unit 403 generates, as a first feature amount pair for each of the N types of objects, a feature amount pair in which two feature amounts constituting the pair are extracted from a plurality of images of objects of the same type, and generates, as a second feature amount pair for every combination of the N types of objects, a feature amount pair in which two feature amounts constituting the pair are extracted from a plurality of images of objects of different types (step S403). Then, the imaging parameter adjustment unit 404 generates a first distribution that is a distribution of collation scores of the first feature amount pairs, generates a second distribution that is a distribution of collation scores of the second feature amount pairs, and on the basis of the degree of separation between the first distribution and the second degree, determines the propriety of adopting the candidate value (step S404).

As described above, according to the present embodiment, it is possible to determine the imaging condition useful for identifying three or more types of objects that are similar to one another. This is because the present embodiment includes the imaging unit 401, the extraction unit 402, the feature amount pair generation unit 403, and the imaging parameter adjustment unit 404 that functions as described above.

Fourth Exemplary Embodiment

Figure 31:
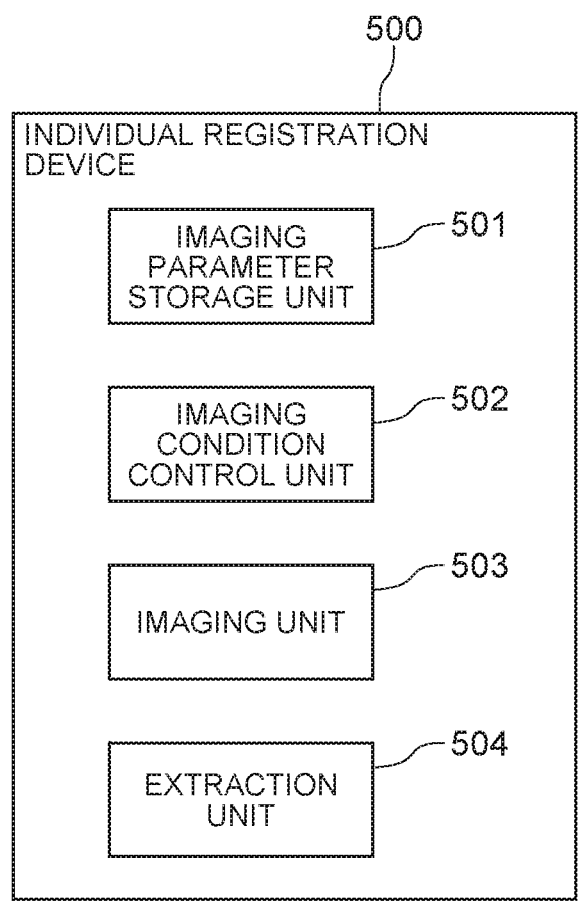
FIG. 31 is a block diagram of an individual registration device according to a fourth exemplary embodiment of the present invention.

Referring to FIG. 31, an individual registration device 500 according to a fourth exemplary embodiment of the present invention includes an imaging parameter storage unit 501, an imaging condition control unit 502, an imaging unit 503, and an extraction unit 504.

The imaging parameter storage unit 501 has a function of storing values of imaging parameters. The imaging parameter storage unit 501 stores the value of the imaging parameter A determined to be adopted by the individual identifying device of FIG. 1, for example. That is, the stored value of the imaging parameter A is a value useful for identifying three or more types of objects that are similar to one another. The imaging condition control unit 502 has a function of setting an imaging condition determined by the value of the imaging parameter stored in the imaging parameter storage unit 501. The imaging condition control unit 502 may have a configuration similar to that of the imaging condition control unit 102 of FIG. 1, for example. However, it is not limited thereto. The imaging unit 503 has a function of acquiring an image of an uneven pattern on a surface of an object not illustrated, under the imaging condition set. The imaging unit 503 may have a configuration similar to that of the imaging unit 101 of FIG. 1, for example. However, it is not limited thereto. The extraction unit 504 has a function of extracting a feature amount from an image acquired by the imaging unit 503 and registering it in a storage unit not illustrated. The extraction unit 504 may have a configuration similar to that of the feature amount extraction unit 104 of FIG. 1, for example. However, it is not limited thereto.

Figure 32:
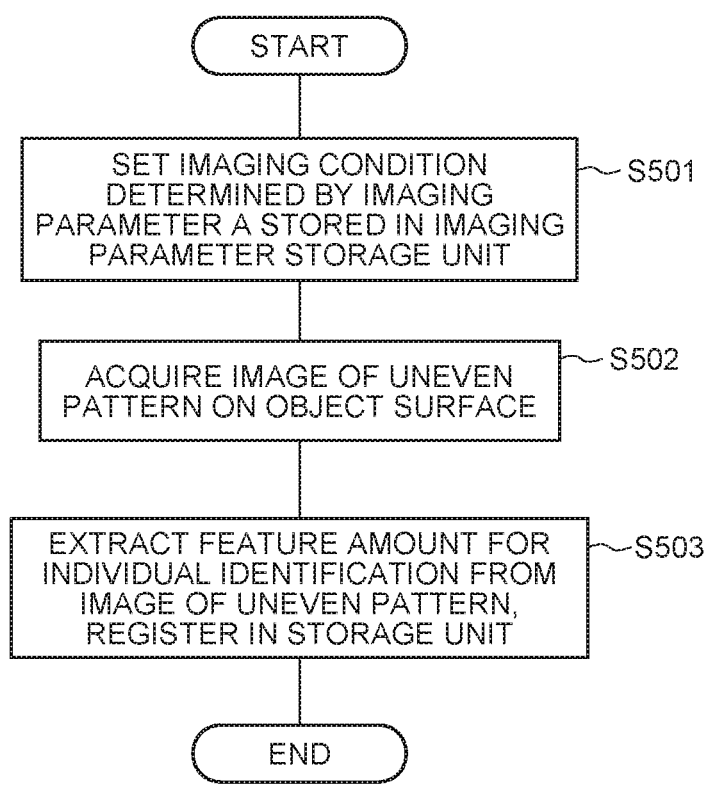
FIG. 32 is a flowchart illustrating an exemplary operation of the individual registration device according to the fourth exemplary embodiment of the present invention.

FIG. 32 is a flowchart illustrating an operation of the individual registration device 500 according to the present embodiment. Hereinafter, the individual registration device 500 according to the present embodiment will be described with reference to FIG. 32.

First, the imaging condition control unit 502 sets an imaging condition determined by the value of an imaging parameter stored in the imaging parameter storage unit 501 (step S501). Then, the imaging unit 503 acquires an image of an uneven pattern on a surface of an object, under the imaging condition set (step S502). Then, the extraction unit 504 extracts a feature amount from an image acquired by the imaging unit 503 and registers it in a storage unit not illustrated (step S503).

As described above, according to the present embodiment, it is possible to acquire images of objects under the imaging condition useful for identifying the objects of three or more types that are similar to one another, extract features from the images, and register them in the storage unit.

Fifth Exemplary Embodiment

Figure 33:
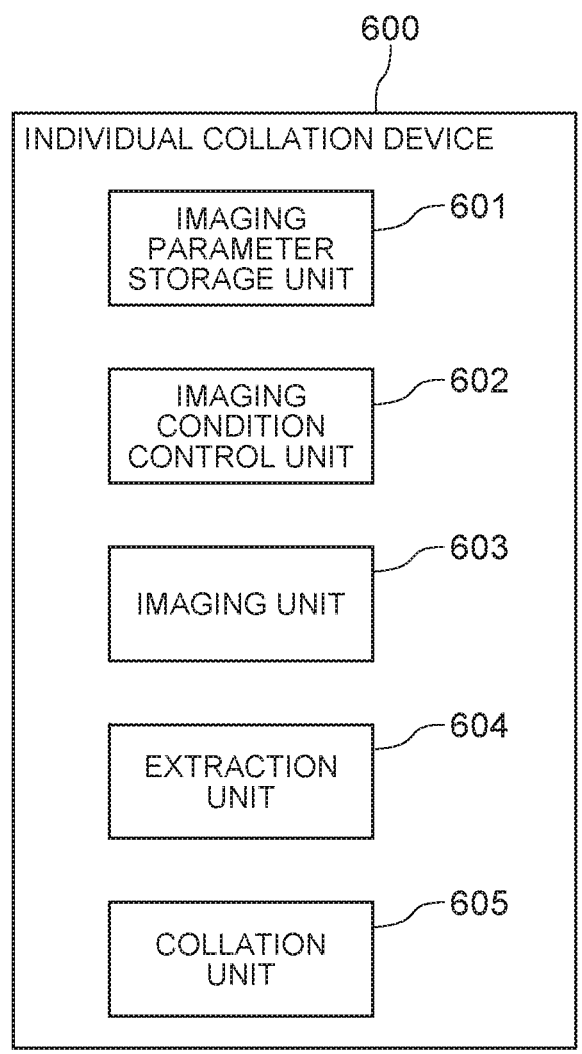
FIG. 33 is a block diagram of an individual collation device according to the fourth exemplary embodiment of the present invention.

Referring to FIG. 33, an individual collation device 600 according to a fifth exemplary embodiment of the present invention includes an imaging parameter storage unit 601, an imaging condition control unit 602, an imaging unit 603, an extraction unit 604, and a collation unit 605.

The imaging parameter storage unit 601 has a function of storing values of imaging parameters. The imaging parameter storage unit 601 stores the value of the imaging parameter A determined to be adopted by the individual identifying device of FIG. 1, for example. That is, the stored value of the imaging parameter A is a value useful for identifying three or more types of objects that are similar to one another. The imaging condition control unit 602 has a function of setting an imaging condition determined by the value of the imaging parameter stored in the imaging parameter storage unit 601. The imaging condition control unit 602 may have a configuration similar to that of the imaging condition control unit 102 of FIG. 1, for example. However, it is not limited thereto. The imaging unit 603 has a function of acquiring an image of an uneven pattern on a surface of an object not illustrated, under the imaging condition set. The imaging unit 603 may have a configuration similar to that of the imaging unit 101 of FIG. 1, for example. However, it is not limited thereto. The extraction unit 604 has a function of extracting a feature amount from an image acquired by the imaging unit 603. The extraction unit 604 may have a configuration similar to that of the feature amount extraction unit 104 of FIG. 1, for example. However, it is not limited thereto. The collation unit 605 has a function of collating a feature amount extracted by the extraction unit 604 with a registered feature amount stored in a storage unit not illustrated. The collation unit 605 may have a configuration similar to that of the score calculation unit 109 and the determination unit 115 of FIG. 1, for example. However, it is not limited thereto.

Figure 34:
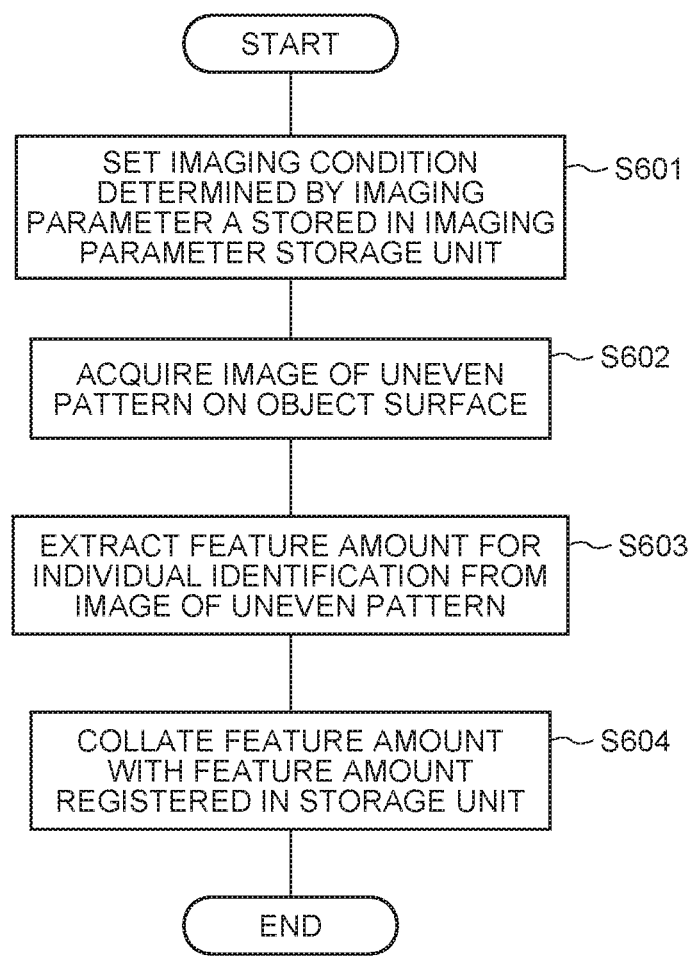
FIG. 34 is a flowchart illustrating an exemplary operation of the individual collation device according to the fourth exemplary embodiment of the present invention.

FIG. 34 is a flowchart illustrating an operation of the individual collation device 600 according to the present embodiment. Hereinafter, the individual collation device 600 according to the present embodiment will be described with reference to FIG. 34.

First, the imaging condition control unit 602 sets an imaging condition determined by the value of an imaging parameter stored in the imaging parameter storage unit 601 (step S601). Then, the imaging unit 603 acquires an image of an uneven pattern on a surface of an object, under the imaging condition set (step S602). Then, the extraction unit 604 extracts a feature amount from the image acquired by the imaging unit 603 (step S603). Then, the collation unit 605 collates the feature amount extracted by the extraction unit 604 with a registered feature amount stored in a storage unit not illustrated (step S604).

As described above, according to the present embodiment, it is possible to acquire an image of an object under the imaging condition useful for identifying objects of three or more types that are similar to one another, extract a feature amount from the image, and collate it with the feature amount registered in the storage unit.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to a field of performing individual identification and management of individual products by acquiring a difference between spontaneous fine patterns generated in the same manufacturing process, such as fine unevenness and patterns on the product surface or random patterns or the like on the material surface, as an image with use of an imaging device such as a camera, and recognizing the fine pattern. For example, the present invention is applicable to management of traceability in the manufacturing lines in a factory or the like and traceability with use of fasteners or the like of brand-named products.

REFERENCE SIGNS LIST

100 individual identifying device
101 imaging unit
102 imaging condition control unit
103 image storage unit
104 feature amount extraction unit
105 feature amount storage unit
106 feature amount pair generation unit
107 first feature amount pair storage unit
108 second feature amount pair storage unit
109 score calculation unit
110 distribution generation unit
111 distribution storage unit
113 imaging parameter determination unit
114 imaging parameter storage unit
115 determination unit
116 information presentation unit
150 information processing device
151 photographing unit
152 operation input unit
153 screen display unit
154 communication interface unit
155 storage unit
156 arithmetic processing unit
157 program
201 camera
202 camera lens
203 coaxial vertical illuminator
204 light source
205 object
206 beam splitter
207 box
210 coaxial vertical illuminator
221 ring illuminator
231 dome illuminator
300 individual identifying device
302 imager
303 height adjuster
304 controller
305 conveyor belt
306 conveyor belt drive
308 light switch
310 object
311 uneven pattern
400 individual identifying device
401 imaging unit
402 extraction unit
403 feature amount pair generation unit
404 imaging parameter adjustment unit
500 individual registration device
501 imaging parameter storage unit
502 imaging condition control unit
503 imaging unit
504 extraction unit
600 individual collation device
601 imaging parameter storage unit
602 imaging condition control unit
603 imaging unit
604 extraction unit
605 collation unit

The invention claimed is:

1. An individual identifying device comprising:
a memory containing program instructions; and
a processor coupled to the memory, wherein the processor is configured to execute the program instructions to:
a) set a value of a specific imaging parameter, among a plurality of types of imaging parameters, as a certain candidate value;
(b) acquire a plurality of images obtained by imaging each of N types of object a plurality of times by changing a value of a remaining imaging parameter, where N is a value greater than or equal to three;
(c) extract a feature amount from each of the plurality of the images;
(d) generate, as a first feature amount pair for each of the N types of objects, a feature amount pair in which two feature amounts constituting the feature amount pair are extracted from a plurality of images of objects of a same type, and generate as a second feature amount pair for every combination of the N types of objects, a feature amount pair in which two feature amounts constituting the feature amount pair are extracted from a plurality of images of objects of different types; and
(e) generate a first distribution that is a distribution of collation scores of a plurality of the first features amount pairs, generate a second distribution that is a distribution of collation scores of a plurality of the second feature amount pairs, and on a basis of a degree of separation between the first distribution and the second distribution, determine propriety of adopting the candidate value.

2. The individual identifying device according to claim 1, wherein the processor is further configured to execute the instructions to
(f) after changing the value of the specific imaging parameter to another candidate value different from the candidate value, repeatedly perform the (b) to the (e).

3. The individual identifying device according to claim 2, wherein
the (e) includes selecting, from among a plurality of the candidate values, one candidate value in which the degree of separation between the first distribution and the second distribution becomes equal to or larger than a preset threshold, as the value of the specific imaging parameter.

4. The individual identifying device according to claim 3, wherein the processor is further configured to execute the instructions to
register the feature amount extracted from an image acquired by imaging a registration object under an imaging condition defined by the selected value of the specific imaging parameter in a storage device, in association with supplementary information of the registration object.

5. The individual identifying device according to claim 4, wherein the processor is further configured to execute the instructions to
collate the feature amount extracted from an image acquired by imaging a collation object under the imaging condition defined by the selected value of the specific imaging parameter with the feature amount stored in the storage device.

6. The individual identifying device according to claim 2, wherein
the (e) includes selecting, from among a plurality of the candidate values, a candidate value in which the degree of separation between the first distribution and the second distribution becomes highest, as the value of the specific imaging parameter.

7. The individual identifying device according to claim 1, wherein
in the (b), a distance from a coaxial vertical illuminator to a surface of the object as the specific imaging parameter, the coaxial vertical illuminator irradiating the surface of the object with illumination light from a light source along an optical axis of a camera lens.

8. The individual identifying device according to claim 1, wherein
in the (b), a distance from a ring illuminator that illuminates a surface of the object to the surface of the object is used as the specific imaging parameter.

9. The individual identifying device according to claim 1, wherein
in the (b) a distance from a dome illuminator that illuminates a surface of the object to the surface of the object is used as the specific imaging parameter.

10. An individual identifying method comprising:
acquiring a plurality of images obtained by imaging each of N types of objects a plurality of times by setting a value of a specific imaging parameter, among a plurality of types of imaging parameters, as a certain candidate value and changing a value of a remaining imaging parameter, where N is a value greater than or equal to three;
extracting a feature amount from each of the plurality of the images;
generating, as a first feature amount pair for each of the N types of objects, a feature amount pair in which two feature amounts constituting the feature amount pair are extracted from a plurality of images of objects of a same type, and generating, as a second feature amount pair for every combination of the N types of objects, a feature amount pair in which two feature amounts constituting the feature amount pair are extracted from a plurality of images of objects of different types; and
generating a first distribution that is a distribution of collation scores of a plurality of the first feature amount pairs, generating a second distribution that is a distribution of collation scores of a plurality of the second feature amount pairs, and on a basis of a degree of separation between the first distribution and the second distribution, determining propriety of adopting the candidate value.

11. A non-transitory computer-readable medium storing a program comprising instructions for causing a computer execute processing to:
acquire a plurality of images obtained by imaging each of N types of objects a plurality of times by setting a value of a specific imaging parameter, among a plurality of types of imaging parameters, as a certain candidate value and changing a value of a remaining imaging parameter, where N is a value greater than or equal to three;
extract a feature amount from each of the plurality of the images;
generate, as a first feature amount pair for each of the N types of objects, a feature amount pair in which two feature amounts constituting the feature amount pair are extracted from a plurality of images of objects of a same type, and generate, as a second feature amount pair for every combination of the N types of objects, a feature amount pair in which two feature amounts constituting the feature amount pair are extracted from a plurality of images of objects of different types; and
generate a first distribution that is a distribution of collation scores of a plurality of the first feature amount pairs, generate a second distribution that is a distribution of collation scores of a plurality of the second feature amount pairs, and on a basis of a degree of separation between the first distribution and the second distribution, determine propriety of adopting the candidate value.

* * * * *